(12) United States Patent
Hosoya et al.

(10) Patent No.: US 8,927,127 B2
(45) Date of Patent: Jan. 6, 2015

(54) SQUARE LITHIUM SECONDARY BATTERY

(71) Applicant: Semiconductor Energy Laboratory Co., Ltd., Atsugi (JP)

(72) Inventors: Kunio Hosoya, Kanagawa (JP); Kunio Kimura, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 76 days.

(21) Appl. No.: 13/689,938

(22) Filed: Nov. 30, 2012

(65) Prior Publication Data

US 2013/0143090 A1 Jun. 6, 2013

(30) Foreign Application Priority Data

Dec. 6, 2011 (JP) ................. 2011-266641

(51) Int. Cl.
*H01M 4/00* (2006.01)
*H01M 10/052* (2010.01)
*H01M 10/0587* (2010.01)
*H01M 4/38* (2006.01)
*H01M 2/02* (2006.01)

(52) U.S. Cl.
CPC .......... *H01M 10/0587* (2013.01); *Y02E 60/122* (2013.01); *H01M 10/052* (2013.01); *H01M 4/386* (2013.01); *Y02T 10/7011* (2013.01); *H01M 2002/0205* (2013.01)
USPC .............. 429/66; 429/60; 429/133; 429/146; 429/209; 429/241

(58) Field of Classification Search
CPC . H01M 10/052; H01M 6/10; H01M 10/0409; H01M 10/0431; H01M 10/0587; H01M 2002/0205; H01M 4/386; H01M 10/125; H01M 10/286; H01M 2006/10; H01M 2006/106; Y02E 60/122; Y02T 10/7011
USPC .............................. 429/60, 66, 146, 209, 241
See application file for complete search history.

(56) References Cited

U.S. PATENT DOCUMENTS

| | | | |
|---|---|---|---|
| 5,641,591 | A | 6/1997 | Kawakami et al. |
| 5,834,139 | A | 11/1998 | Shodai et al. |
| 7,147,971 | B2 | 12/2006 | Okamoto et al. |
| 7,235,330 | B1 | 6/2007 | Fujimoto et al. |
| 7,393,476 | B2 | 7/2008 | Shiozaki et al. |
| 7,432,010 | B2 | 10/2008 | Dokko |

(Continued)

FOREIGN PATENT DOCUMENTS

| | | |
|---|---|---|
| JP | 05-041211 | 2/1993 |
| JP | 07-153490 | 6/1995 |

(Continued)

*Primary Examiner* — Patrick Ryan
*Assistant Examiner* — Ben Lewis
(74) *Attorney, Agent, or Firm* — Nixon Peabody LLP; Jeffrey L. Costellia

(57) ABSTRACT

A square lithium secondary battery includes a wound body in which a collective sheet in which a positive electrode sheet and a negative electrode sheet overlap each other with a first separator interposed therebetween is wound while a second separator is put inside the collective sheet. An active material mixture layer on one or both surfaces of at least one of the positive electrode sheet and the negative electrode sheet includes a region with a plurality of openings and a region with no opening. At least a bent portion of the collective sheet is covered with the region with the plurality of openings.

20 Claims, 14 Drawing Sheets

(56) References Cited

U.S. PATENT DOCUMENTS

| | | |
|---|---|---|
| 7,521,151 B2 | 4/2009 | Hwang et al. |
| 7,592,099 B2 | 9/2009 | Tamura et al. |
| 2002/0102464 A1 | 8/2002 | Yoshida et al. |
| 2002/0122985 A1 | 9/2002 | Sato et al. |
| 2004/0234857 A1 | 11/2004 | Shiozaki et al. |
| 2006/0068290 A1* | 3/2006 | Sawa et al. ............ 429/231.1 |
| 2007/0059584 A1 | 3/2007 | Nakano et al. |
| 2007/0160906 A1 | 7/2007 | Tooyama et al. |
| 2007/0212609 A1 | 9/2007 | Iwami |
| 2008/0297981 A1 | 12/2008 | Endo et al. |
| 2009/0087731 A1 | 4/2009 | Fukui et al. |
| 2009/0104515 A1 | 4/2009 | Fujikawa et al. |
| 2009/0220862 A1 | 9/2009 | Toyama et al. |
| 2010/0003599 A1 | 1/2010 | Nonoshita et al. |
| 2010/0209784 A1 | 8/2010 | Yamazaki et al. |
| 2010/0227228 A1 | 9/2010 | Yamazaki et al. |
| 2010/0233542 A1 | 9/2010 | Endo et al. |
| 2011/0229757 A1 | 9/2011 | Kawakami et al. |

FOREIGN PATENT DOCUMENTS

| | | | |
|---|---|---|---|
| JP | 08-007882 | 1/1996 | |
| JP | 08-153515 | 6/1996 | |
| JP | 10-270068 | * 10/1998 | ............ H01M 10/04 |
| JP | 2001-283834 | 10/2001 | |
| JP | 2002-343340 | 11/2002 | |

* cited by examiner

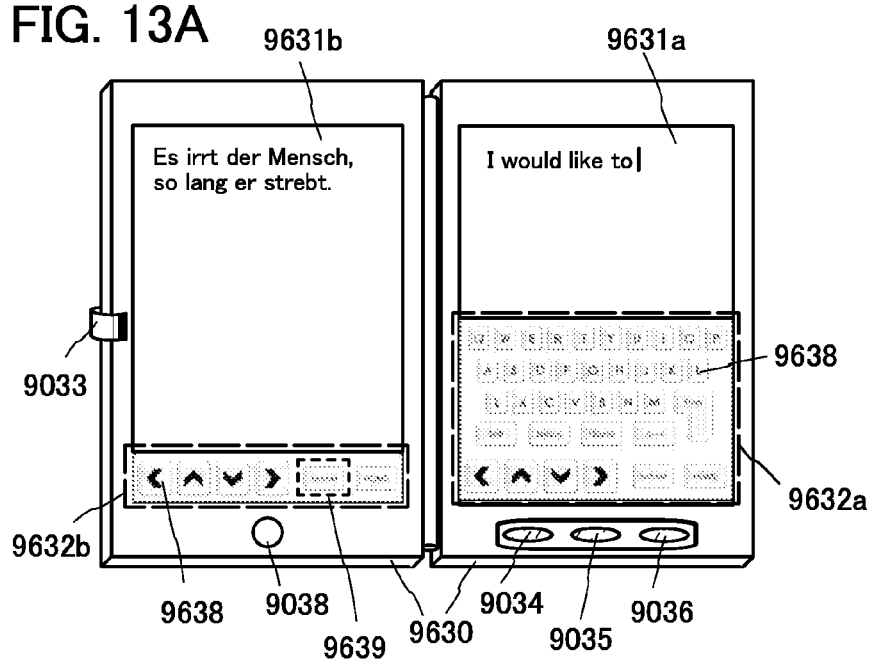
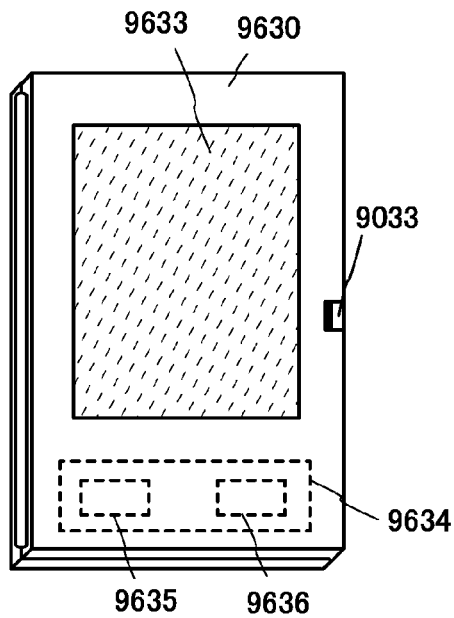
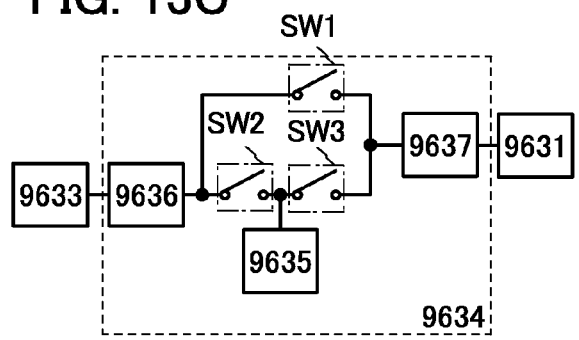

SQUARE LITHIUM SECONDARY BATTERY

BACKGROUND OF THE INVENTION

1. Field of the Invention

The present invention relates to a square lithium secondary battery.

2. Description of the Related Art

With recent advances in environmental technology, power generation devices (e.g., solar power generation devices) which pose less burden on the environment than in conventional power generation methods have been actively developed. Concurrently with the development of power generation technology, development of power storage devices such as lithium secondary batteries, lithium-ion capacitors, and air cells has also been advanced.

In particular, demand for lithium secondary batteries has rapidly grown with the development of the semiconductor industry, for the purpose of use in the next generation of clean energy vehicles such as hybrid electric vehicles (HEV), electric vehicles (EV), and plug-in hybrid electric vehicles (PHEV); personal digital assistants such as cellular phones, smart phones, and laptop computers; and portable consumer equipment such as portable music players and digital cameras. Now, the lithium secondary batteries are indispensable as a rechargeable energy source in the modern information society. In particular, square lithium secondary batteries with high capacity and high output are required for use in the electronic vehicles or the consumer equipment.

A square lithium secondary battery has a wound body obtained by winding a long sheet plural times, the long sheet including a positive electrode, a separator, and a negative electrode which overlap each other. Therefore, bends occurring in winding are likely to be broken, that is, an active material mixture layer on a corner is likely to be cracked, flaked, slipped, or the like so that the separated active material penetrates the separator, which might cause a short-circuit between the positive and negative electrodes. Thus, in Patent Documents 1 and 2, a wound body is formed in such a manner that an active material mixture layer is partly removed or flaked in advance so as not to be formed in a bend with a small radius of curvature.

A negative electrode used in a winding lithium secondary battery is manufactured by forming a negative electrode active material mixture layer on both surfaces of a sheet-like current collector. The material conventionally used as the negative electrode active material is graphite, which allows occlusion and release of ions serving as carriers (hereinafter, referred to as carrier ions). That is, graphite as a negative electrode active material, carbon black as a conductive additive, and a resin as a binder are kneaded to form a slurry, and the slurry is applied on a current collector and dried, whereby a negative electrode is manufactured.

On the other hand, in the case where silicon or phosphorus-doped silicon is used as the negative electrode active material, about four times larger amount of carrier ions can be occluded than that in the case of using carbon, and a silicon negative electrode has a theoretical capacity as high as 4200 mAh/g which is significantly higher than the theoretical capacity of a carbon (graphite) negative electrode, 372 mAh/g. Thus, silicon is a suitable material for increasing the capacity of a secondary battery, and a lithium secondary battery using silicon as a negative electrode active material is now being actively developed for the purpose of increase in capacity.

However, with an increase in the amount of occlusion of carrier ions, the volume of an active material greatly changes in accordance with occlusion and release of carrier ions in charge/discharge cycle, resulting in lower adhesion between a current collector and silicon and degradation in battery characteristics due to charge/discharge. Furthermore, in some cases, there is a serious problem in that silicon is damaged to be exfoliated or pulverized leading to loss of function as a battery.

Thus, in Patent Document 3 for example, a columnar or powder layer of microcrystalline or amorphous silicon is formed as a negative electrode active material layer over a current collector made of copper foil or the like with a rough surface, and a layer of a carbon material such as graphite having a lower conductivity than silicon is formed over the silicon active material layer. With such a structure, current can be collected through the layer made of the carbon material such as graphite even when the silicon active material layer is flaked, whereby degradation in battery characteristics can be reduced.

REFERENCES

Patent Documents

[Patent Document 1] Japanese Published Patent Application No. H7-153490
[Patent Document 2] Japanese Published Patent Application No. H10-270068
[Patent Document 3] Japanese Published Patent Application No. 2001-283834

SUMMARY OF THE INVENTION

However, it is in practice very difficult for the electrode manufacturing technology to provide a wound body in a square lithium secondary battery in such a manner that an active material mixture layer is not formed in a bend with a small radius of curvature as described in Patent Document 1 or 2. In order to manufacture a wound body so that an active material mixture layer is not formed in a bend with a small radius of curvature, an area as small as a few millimeters which is to be a bend needs to be expected and an active material layer in that area needs to be removed or flaked. However, in terms of the position control accuracy in manufacture of electrodes, it is difficult to precisely remove or flake the active material layer in that area of the wound body. This is because a current collector made with a long sheet including a positive electrode, a separator, and a negative electrode which overlap each other, or an active material mixture layer has variation in film thickness in manufacture, the winding process is carried out by hand, and the like.

Furthermore, in the square lithium secondary battery disclosed in Patent Document 1 or 2, the active material mixture layer is not formed in a bend with a small radius of curvature, which leads to a reduction in discharge capacity. Thus, the surface area of an electrode in a wound body cannot be utilized sufficiently.

In the case where silicon is used as a negative electrode active material for the purpose of increase in the capacity of a secondary battery as disclosed in Patent Document 3, the volume of silicon increases about four times due to insertion of carrier ions. Accordingly, predetermined stress is constantly concentrated in bends in a wound body which have a small radius of curvature, which may cause serious flaking of an active material mixture layer. This makes it difficult to prevent damage to the negative electrode active material and to maintain the reliability as a battery. Further, in the case where the exfoliated active material penetrates a separator leading to a short-circuit between the positive and negative electrodes, an electrolyte solution in the secondary battery is decomposed and vaporized due to generated heat, which might cause ignition and pose a safety hazard.

In view of the above, one embodiment of the present invention provides a square lithium secondary battery with high reliability without reducing charge and discharge capacity.

In order to solve the aforementioned problems, the inventors have found that the stress applied on bends in a wound body which have a small radius of curvature can be reduced by using the following structure: in an electrode sheet of the wound body used in a square lithium secondary battery, a plurality of openings are formed at predetermined positions of an active material mixture layer. The inventors have also found that such a structure prevents deterioration of the electrode sheet due to charge and discharge of the square lithium secondary battery.

One embodiment of the present invention is a square lithium secondary battery including a wound body in which a collective sheet in which a positive electrode sheet and a negative electrode sheet overlap each other with a first separator interposed therebetween is wound while a second separator is put inside the collective sheet. In each of the positive electrode sheet and the negative electrode sheet, an active material mixture layer is provided on both surfaces of a current collector. The active material mixture layer on one or both surfaces of at least one of the positive electrode sheet and the negative electrode sheet includes a region with a plurality of openings and a region with no opening. At least a bent portion of the collective sheet is covered with the region with the plurality of openings.

For example, the region with the plurality of openings is provided on the active material mixture layer of the electrode sheet, and is extended in each of the left and right sides in the longitudinal direction by the length greater than or equal to 5% and less than or equal to 20% of the length L of the region with the plurality of openings, whereby a margin can be made. As a result, it is possible to allow the misalignment of the bent portion in the range of greater than or equal to 5% and less than or equal to 20% in each of the left and right sides. Besides the above, the range of the margin can be determined as appropriate, and the margin can be added to the bent portion so that at least the bent portion of the collective sheet is covered with the region with the plurality of openings.

The plurality of openings are preferably provided along the entire length of the collective sheet in the direction perpendicular to the longitudinal direction of the collective sheet.

The plurality of openings are preferably arranged at equal intervals in the region with the plurality of openings.

Alternatively, the distance between the plurality of openings may be gradually decreased closer to a bent portion in the collective sheet having the smallest radius of curvature.

Further alternatively, the plurality of openings may be arranged more closely closer to a bent portion in the collective sheet having the smallest radius of curvature.

The active material mixture layer in the negative electrode sheet may include graphite, and preferably includes silicon or silicon containing an impurity imparting conductivity, such as phosphorus.

The active material mixture layer in each of the positive electrode sheet and the negative electrode sheet is preferably provided on a top surface and a bottom surface of the current collector included in each of the positive electrode sheet and the negative electrode sheet.

The negative electrode active material is preferably covered with graphene. Graphene refers to a sheet of carbon molecules having $sp^2$ bonds with a thickness of one atomic layer. Graphene includes single-layer graphene and multi-layer graphene in its category. Graphene may contain oxygen at a concentration higher than or equal to 2 atomic % and lower than or equal to 11 atomic %, preferably higher than or equal to 3 atomic % and lower than or equal to 10 atomic %.

The negative electrode active material mixture layer may have a structure including a common portion and a plurality of projection portions projecting from the common portion. With such a structure, the density of projections can be increased in the negative electrode active material mixture layer, whereby the surface area can be increased. Thus, a square lithium secondary battery with high charge and discharge capacity can be obtained.

By using any of the aforementioned structures, the square lithium secondary battery has improved reliability while maintaining high discharge capacity.

When a surface of the active material is in contact with an electrolyte solution in the lithium secondary battery, the electrolyte solution and the active material react with each other, so that a film is formed over the surface of the active material. The film is called a solid electrolyte interface (SEI) and considered necessary to relieve the reaction between the active material and the electrolyte solution and for stabilization. However, with an increase in the thickness of the film, carrier ions are less likely to be occluded in an electrode, leading to a problem such as a decrease in the carrier ion conductivity between the active material and the electrolyte solution, and a waste of the electrolyte solution. Graphene covering the negative electrode active material can suppress an increase in the thickness of the film, so that a decrease in carrier ion conductivity and a waste of the electrolyte solution can be suppressed.

A square lithium secondary battery with high reliability and no short-circuit between electrodes can be provided. Further, a square lithium secondary battery with high capacity can be provided.

BRIEF DESCRIPTION OF THE DRAWINGS

In the accompanying drawings:
FIGS. 13A to 13C illustrate an electric device.

DETAILED DESCRIPTION OF THE INVENTION

Embodiments will be described below with reference to drawings. Note that the embodiments can be implemented in various modes, and it is apparent to those skilled in the art that modes and details can be modified in a wide variety of ways without departing from the spirit and scope of the present invention. Therefore, the present invention is not interpreted as being limited to the description of the embodiments below.

Embodiment 1

In this embodiment, a structure of an electrode sheet for a square lithium secondary battery will be described with reference to FIGS. 1A to 1B, FIGS. 3A to 3C, and FIGS. 4A and 4B. In the structure, a plurality of openings are formed in a part of an active material mixture layer which corresponds to a bend in a collective sheet in a wound body. The electrode sheet refers to a positive electrode sheet and a negative electrode sheet.

A lithium secondary battery refers to a secondary battery in which lithium ions are used as carrier ions. As examples of carrier ions which can be used instead of lithium ions, alkali-metal ions such as sodium ions and potassium ions; alkaline-earth metal ions such as calcium ions, strontium ions, and barium ions; beryllium ions; magnesium ions; and the like are given.

Figure 1A:
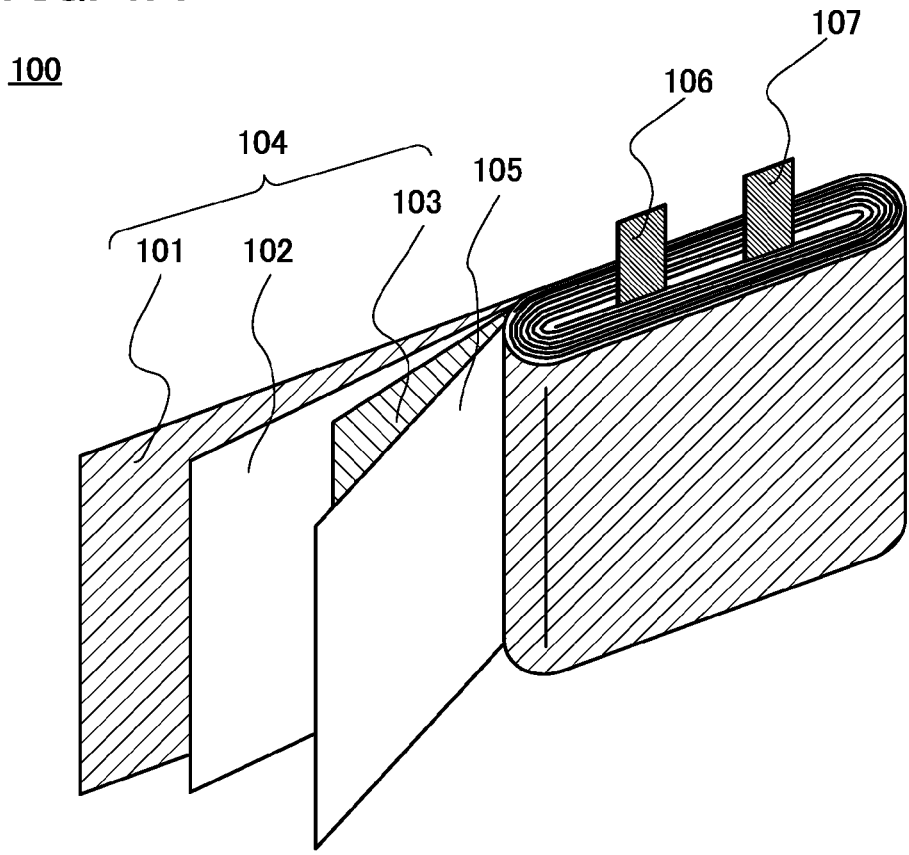
FIGS. 1A and 1B illustrate a wound body.

FIG. 1A is a schematic view of a wound body 100 incorporated in a square lithium secondary battery. A positive electrode sheet and the like shown in FIG. 1A are spread for clarity. The wound body 100 is obtained by winding a collective sheet 104 in which a positive electrode sheet 101 and a negative electrode sheet 103 overlap each other with a separator 102 interposed therebetween. The collective sheet 104 is wound while a separator 105 different from the separator 102 is put inside the collective sheet 104. The positive electrode sheet 101, the separators 102 and 105, and the negative electrode sheet 103 are long band-like sheets. Although the separator 102 and the separator 105 are shown as different sheets in FIG. 1A, the separator 102 and the separator 105 may be a continuous sheet. One end of the positive electrode sheet 101 is connected to a positive electrode lead 106, and one end of the negative electrode sheet 103 is connected to a negative electrode lead 107. The leads are connected to the respective positive and negative terminals, which allows charge and discharge from/to the outside of the battery.

Figure 1B:
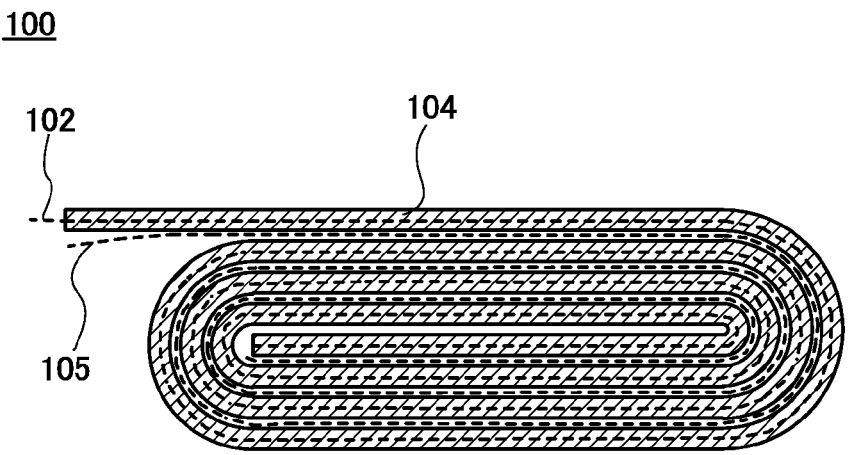

FIG. 1B schematically shows a cross-section of the wound body 100 illustrated in FIG. 1A, which is perpendicular to the surface of each sheet in the wound body 100. The positive electrode sheet 101, the separators 102 and 105, and the negative electrode sheet 103 are long band-like sheets, each having flexibility. Accordingly, as illustrated in FIG. 1B, the collective sheet 104 in which the separator 102 is sandwiched between the positive electrode sheet 101 and the negative electrode sheet 103 can be wound with the other separator 105 put inside the collective sheet 104.

Figure 2A:
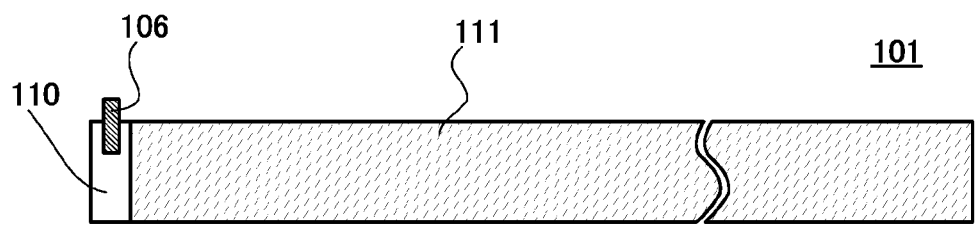
FIGS. 2A to 2D illustrate a conventional wound body.
Figure 2B:
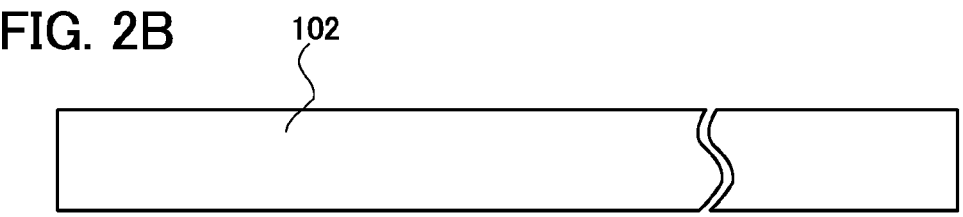
Figure 2C:
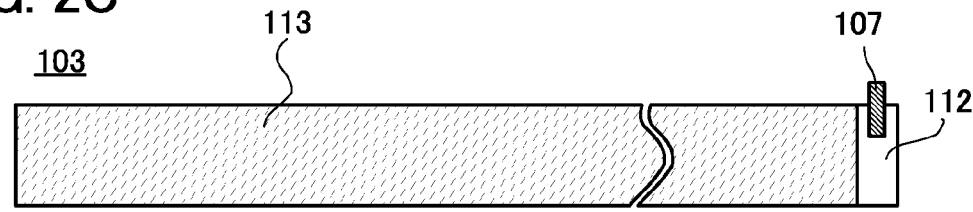
Figure 2D:
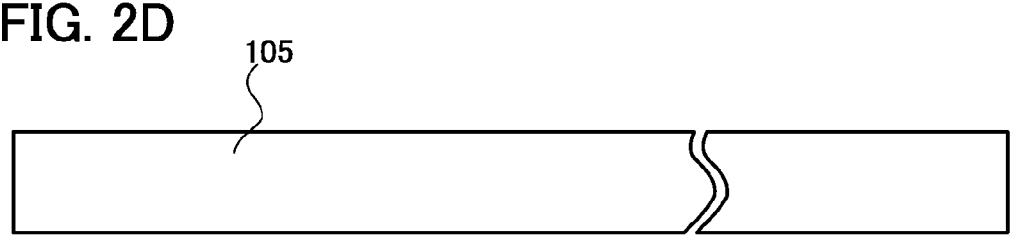

A structure of a conventional wound body will be described with reference to FIGS. 2A to 2D. FIG. 2A corresponds to the positive electrode sheet 101 illustrated in FIGS. 1A and 1B, FIG. 2B corresponds to the separator 102, FIG. 2C corresponds to the negative electrode sheet 103, and FIG. 2D corresponds to the separator 105. The positive electrode sheet 101 illustrated in FIG. 2A has a structure in which a positive electrode active material mixture layer 111 is provided on a band-like positive electrode current collector 110. The positive electrode active material mixture layer 111 is not provided on the left side edge of the positive electrode sheet 101 so that the positive electrode current collector 110 is exposed. The positive electrode lead 106 is provided in the exposed area so as to be electrically connected to the positive electrode current collector 110. The other area of the positive electrode current collector 110 is covered with the positive electrode active material mixture layer 111. The same applies to the back surface of the positive electrode sheet 101 not illustrated. Note that the positive electrode lead is not necessarily provided on the back surface if it is provided on the front surface.

The negative electrode sheet 103 has a structure similar to that of the positive electrode sheet 101. In the positive electrode sheet 101 or the negative electrode sheet 103, the active material mixture layer is formed on almost the whole surface of the current collector as described above. Therefore, the active material mixture layer is flaked or exfoliated in a portion bent in winding, which causes a short-circuit between the electrodes and poses a safety hazard.

(Structure of Electrode Sheet)

This embodiment will be described with reference to FIGS. 3A to 3C, which is in contrast to the conventional example illustrated in FIGS. 2A to 2D. An example of the positive electrode sheet will be described here; a similar structure can also be applied to the negative electrode sheet. Note that the positive electrode sheet and the negative electrode sheet are collectively referred to as an electrode sheet.

Figure 3A:
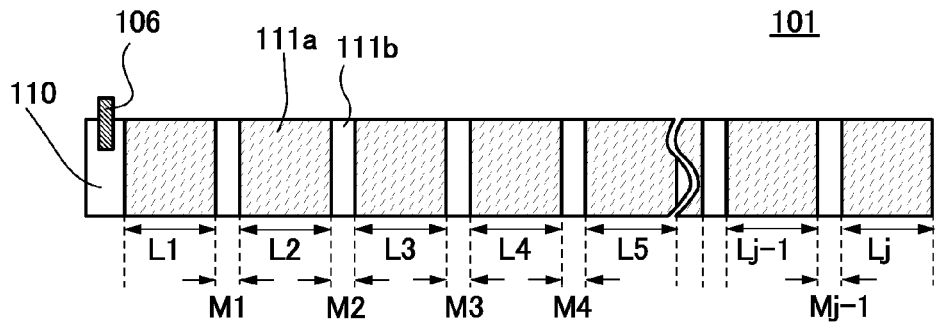
FIGS. 3A to 3C illustrate an electrode sheet.

FIG. 3A is a schematic view illustrating the positive electrode sheet 101 in this embodiment. The positive electrode active material mixture layer 111 provided on the positive electrode current collector 110 is divided into a region 111a with no opening and a region 111b with a plurality of openings. The region 111a with no opening and the region 111b with the plurality of openings are alternately arranged in the longitudinal direction of the positive electrode sheet 101. In the region 111a with no opening, a positive electrode active material mixture is formed into a flat thin film on the positive electrode current collector 110. On the other hand, in the region 111b with the plurality of openings, a positive electrode material mixture layer provided on the positive electrode current collector 110 includes a plurality of openings 114 as illustrated in FIGS. 3B and 3C. Further, an island pattern 115 of the positive electrode active material mixture layer is provided between adjacent openings 114. In other words, in a part of the region 111b with the plurality of openings, the positive electrode active material mixture layer is not provided on the positive electrode current collector 110, and in the other part of the region 111b, the positive electrode active material mixture layer is provided on the positive electrode current collector 110. It is also said that the region 111b with the plurality of openings includes exposed areas of the positive electrode current collector 110. The plurality of openings 114 are provided along the entire length of the positive electrode sheet 101 in the direction perpendicular to the longitudinal direction of the positive electrode sheet 101.

Figure 3B:
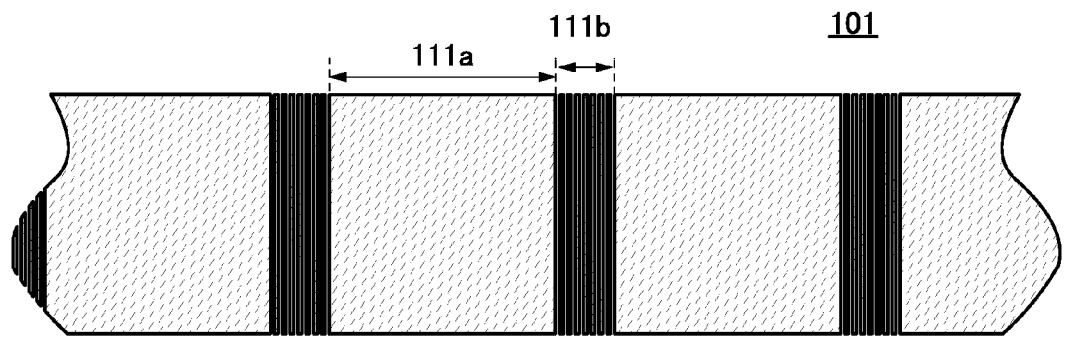
Figure 3C:
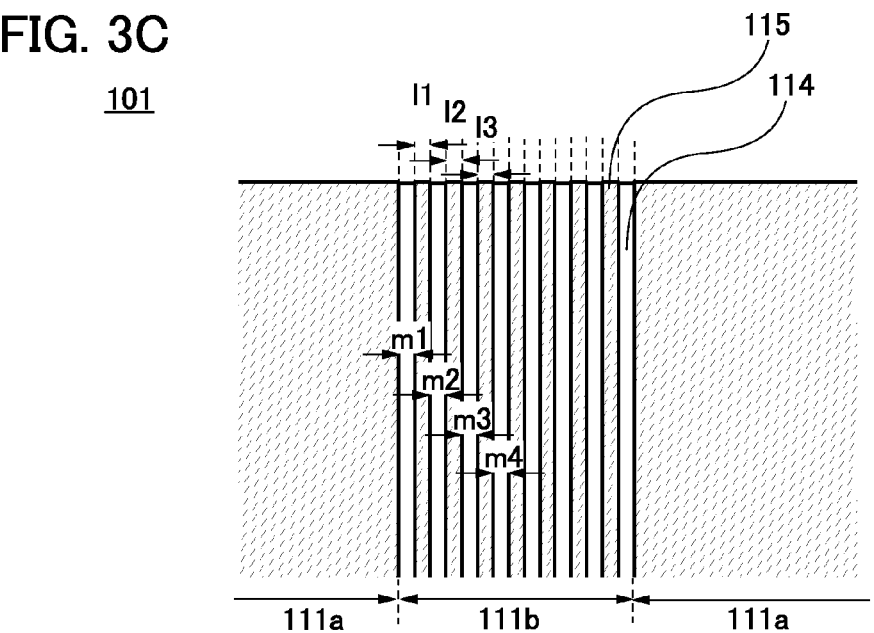

As illustrated in FIG. 3C, the length of each opening 114 in the longitudinal direction of the positive electrode sheet 101 is denoted by m, and the lengths of k openings are denoted by m1, m2, m3, . . . mk in order from the left. The length of each region of the positive electrode active material mixture layer which is provided between the adjacent openings (namely, the island pattern 115) is denoted by l, and the lengths of the (k−1) island patterns are denoted by l1, l2, l3, . . . l(k−1) in order from the left.

At this time, the lengths m1 to mk can each be set to a given value; in particular, it is preferable that m1 to mk all have the same value. As described in detail below, it is extremely difficult to form the regions with a plurality of openings 111b so as to be precisely aligned only with the bends of the collective sheet which occur in winding. Therefore, a feature of this embodiment is to provide a margin to compensate for some misalignment. Since this embodiment is based on the assumption that precise alignment is difficult, the lengths of the plurality of openings 114 are made the same so that some misalignment can be compensated.

From the same reason, the lengths l1 to l(k−1) are preferably made the same although they can each be set to a given value. In addition, it is preferable that m<l be satisfied where m denotes the length of the opening 114 in the region 111b with the plurality of openings while l denotes the length of the positive electrode active material mixture layer. This is because sufficient discharge capacity cannot be obtained if m is larger than l. On the other hand, in the case of m<<l, adjacent positive electrode active material mixture layers that are partly provided in the region 111b with the plurality of openings might be in contact with each other in the winding of the collective sheet and deteriorate. Thus, the length m is preferably set to a value large enough to prevent contact between adjacent positive electrode active material mixture layers.

In the case where j regions 111a with no opening are arranged with the regions with a plurality of openings 111b interposed therebetween as illustrated in FIG. 3A, the lengths of the regions 111a with no opening in the longitudinal direction of the positive electrode sheet 101 are denoted by L1, L2, . . . Lj in order from the left. When a wound body is wound one time, the thickness of the wound body is theoretically increased by the thicknesses of a collective sheet and a separator. Therefore, each distance between the regions with no opening is not made the same but needs to be increased by the thickness of the wound body. Similarly, the lengths of the regions with a plurality of openings 111b are denoted by M1, M2, . . . M(j–1) in order from the left. At this time, the lengths M1 to M(j–1) are set so as to completely cover the respective bends in the wound body 100 which occur in the winding of the collective sheet. With an increase in the number of times of winding, the thickness of the wound body is increased and the radius of curvature of a bend in the wound collective sheet is increased; thus, the length M of the region 111b with the plurality of openings is preferably increased in the order of M1, M2, . . . M(j–1). As a result, even in the case where misalignment due to winding occurs in each winding of the collective sheet or manufacturing of a battery, the misalignment can be compensated because the regions with a plurality of openings 111b are provided in the bends occurring in the winding of the collective sheet.

Figure 4A:
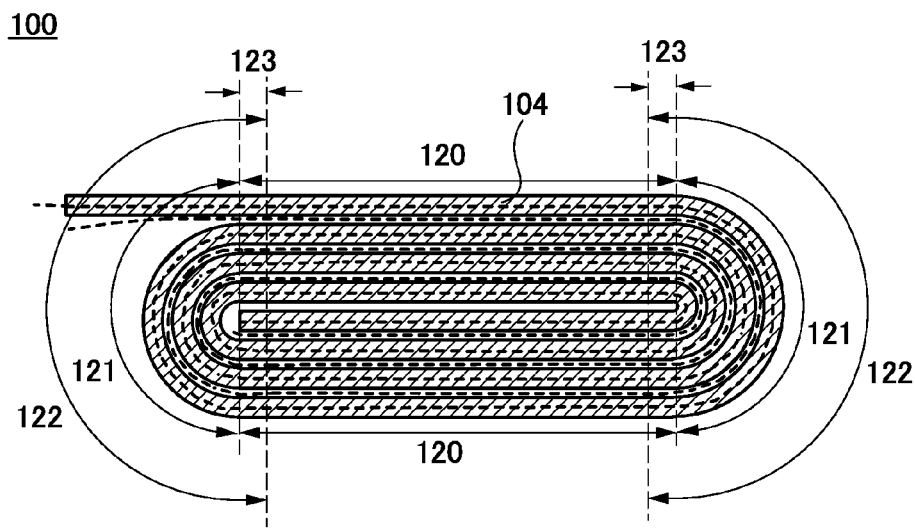
FIGS. 4A and 4B illustrate an electrode sheet.

FIG. 4A is a diagram corresponding to FIG. 1B and illustrates a margin of the collective sheet 104 in the wound body 100. The winding of the collective sheet 104 produces a portion not bent 120 (or a substantially flat portion) and a bent portion 121. The active material mixture layer including openings shown in this embodiment is provided so as not to be flaked or exfoliated in the bent portion 121; thus, the region 111b with the plurality of openings is naturally formed in this portion. However, as described above, the region 111b with the plurality of openings is sometimes misaligned with the bent portion 121 in the collective sheet because of, for example, variation in the thickness of the current collector or the active material mixture layer in manufacture, or a difference in the gap between each sheet due to a difference in the strength of winding. In order to accept such variation in manufacture, a margin 123 is provided in advance in the region 111b with the plurality of openings. Accordingly, the portion bent in winding 121 can be included in the region 111b with the plurality of openings which includes the margin 123 (a portion 122 covering a bend).

Figure 4B:
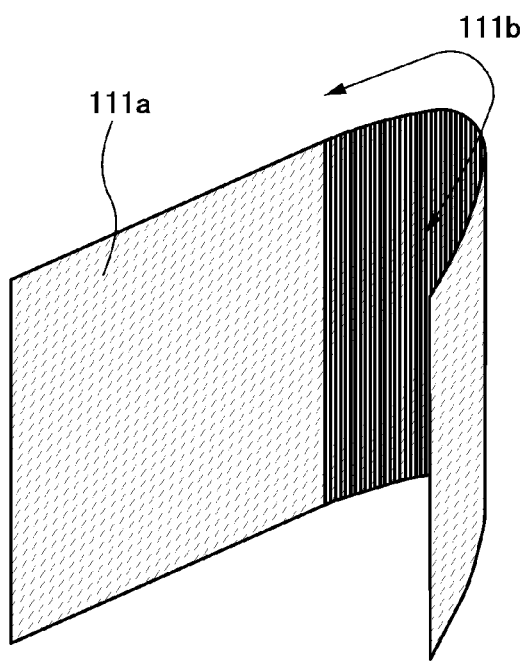

Specifically, the margin 123 can be made by extending the region 111b with the plurality of openings in the left and right sides in the longitudinal direction by the length greater than or equal to 5% and less than or equal to 20% of the length L of the region 111b with the plurality of openings. As a result, it is possible to compensate for the misalignment of the bent portion 121 in the range of greater than or equal to 5% and less than or equal to 20% in each of the left and right sides. Besides the above, the range of the margin 123 can be determined as appropriate and the margin 123 can be added to the bent portion 121 in accordance with the shape of the wound body. Thus, as illustrated in FIG. 4B, the region 111b with the plurality of openings can be arranged so as to include the bent portion of the collective sheet. Note that a too large margin 123 might cause a significant decrease in discharge capacity. Therefore, the range of the margin 123 is preferably determined in consideration of the degree of misalignment in a winding process.

A bend in the collective sheet occurring in winding has a smaller radius of curvature closer to the center of the wound body, namely, the innermost circumference of the wound body. Accordingly, in the manufacturing process of a wound body, the active material mixture layer on the current collector is flaked or exfoliated more frequently closer to the center of the wound body. It is thus preferable that the length m of the opening and the length l of the active material mixture layer shown in FIG. 3C be made the smallest on the innermost circumference. The number of openings may be reduced on the outermost circumference of the wound body so that the length l of the active material mixture layer can be increased. The length M of the region 111b with the plurality of openings illustrated in FIG. 3C may also be increased on the outermost circumference of the wound body. This is because the effect of misalignment due to winding is more significant on the outermost circumference of the wound body.

Next, cross-sectional structures of the positive electrode sheet will be described with reference to FIGS. 5A to 5D and FIGS. 6A and 6B. FIGS. 5A to 5D illustrate examples of the cross-sectional structure of the region 111b with the plurality of openings in the positive electrode sheet in the longitudinal direction (i.e., the direction perpendicular to the longitudinal direction of the openings). In each of the cross-sections illustrated in FIGS. 5A to 5D, the positive electrode active material mixture layer 111 is provided on both surfaces (on the top and bottom in FIGS. 5A to 5D) of the positive electrode current collector 110. The positive electrode active material mixture layer 111 is divided into the plurality of island patterns 115, and the opening 114 in which the positive electrode current collector 110 is exposed is provided between the island patterns 115. In FIGS. 5A to 5D, the island patterns 115 made of the positive electrode active material mixture layer 111 are arranged at regular intervals with the opening 114 interposed therebetween; however, as described above, the island patterns 115 and the openings 114 are not necessarily arranged at regular intervals.

Figure 5A:
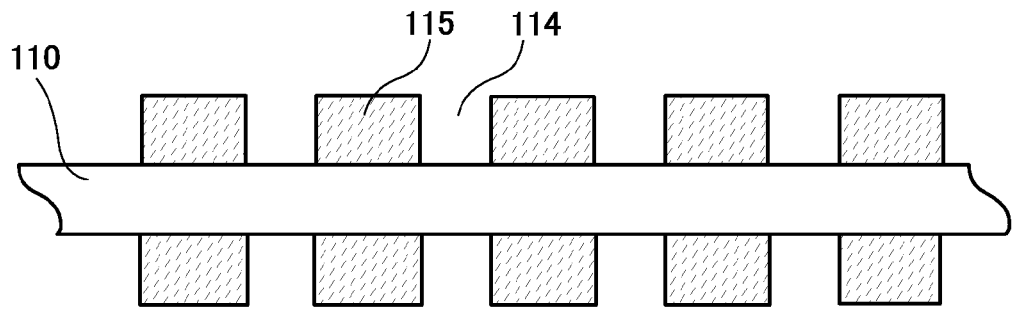
FIGS. 5A to 5D each illustrate a cross-section of an electrode sheet.
Figure 5B:
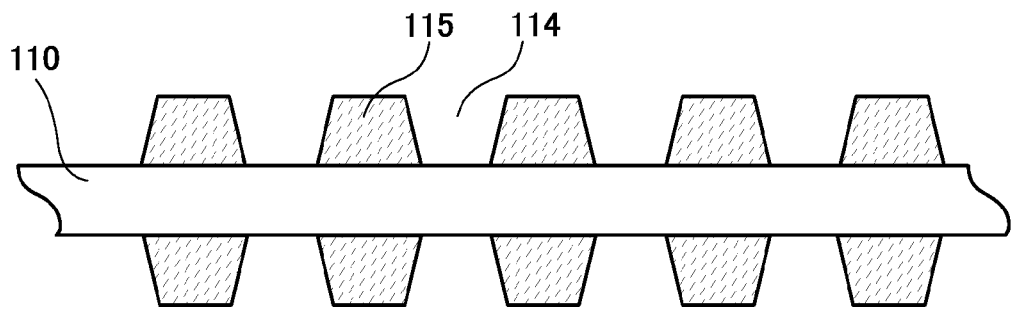
Figure 5C:
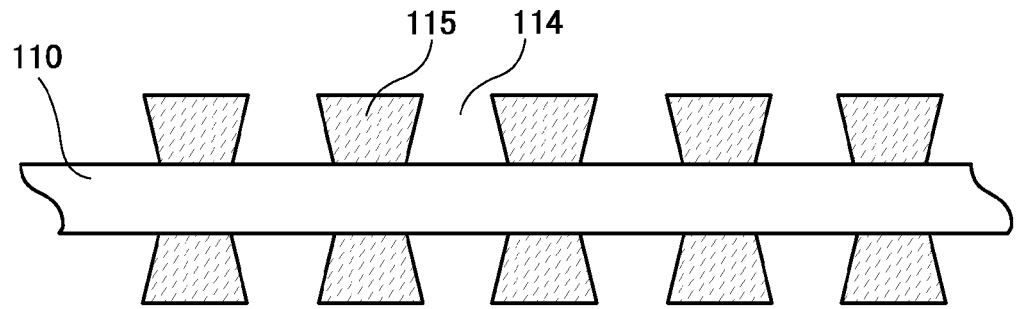
Figure 5D:
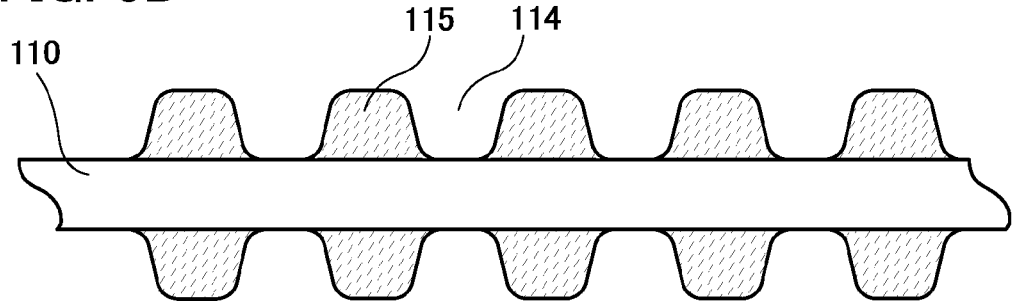

In FIG. 5A, the island patterns 115 are formed so as to have a substantially vertical sidewall in the cross-section. In FIG. 5B, the island patterns 115 have a so-called tapered shape in which the sidewall has an inclination angle. The tapered sidewall of the island patterns 115 increases the adhesion with the positive electrode current collector which is the base. Furthermore, in FIG. 5D, the top ends of the island patterns 115 are rounded and the bottom ends thereof are trailed (the inner side of the bottom ends has a convex surface), so as to reduce the stress concentration on the corner which occurs in winding of the collective sheet and due to expansion and contraction of the active material in charge and discharge. On the other hand, in FIG. 5C, the shape of the island patterns 115 is an inverted trapezoid, whereby the area of the opening 114 can be increased and the stress applied on the island patterns in winding can be reduced. Note that the cross-sectional shapes illustrated in FIGS. 5A to 5D are examples and the embodiment of the present invention is not limited to these examples.

In FIGS. 5A to 5D, the island pattern formed on one surface of the positive electrode current collector and the island pattern formed on the other surface thereof face each other with the positive electrode current collector interposed therebetween; however, the positional relationship between the island patterns is not limited to this. The island pattern formed on one surface of the positive electrode current collector and the island pattern formed on the other surface can also be provided so as to partly overlap each other or so as not to overlap each other.

Figure 6A:
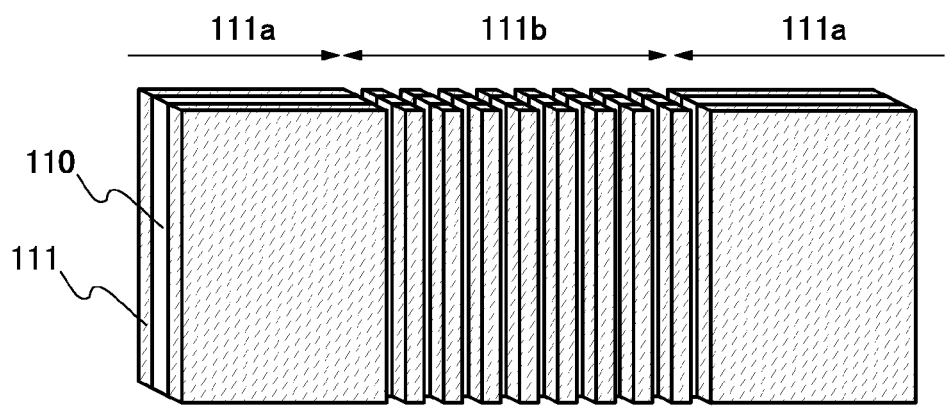
FIGS. 6A and 6B each illustrate a cross-section of an electrode sheet.
Figure 6B:
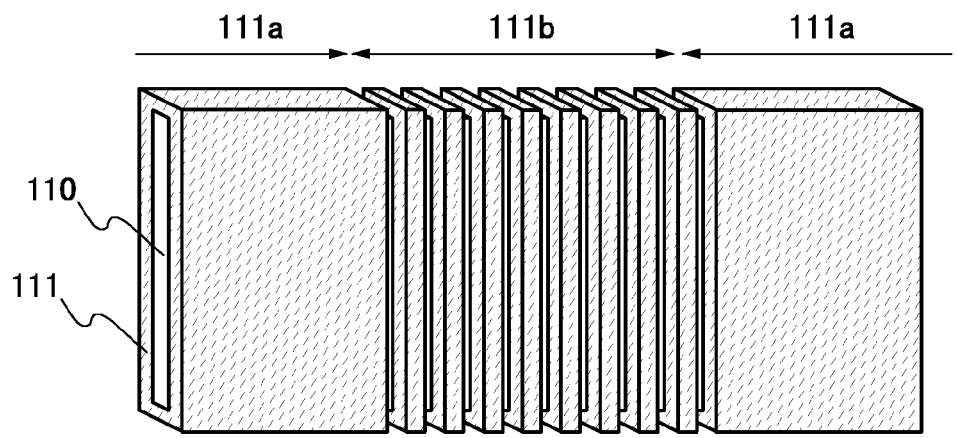

FIGS. 6A and 6B are schematic views each illustrating a cross-section of the positive electrode sheet 101 in the direction perpendicular to the longitudinal direction. In FIG. 6A, the positive electrode active material mixture layer 111 is provided on both sides of the positive electrode current collector 110 in the positive electrode sheet 101. In the regions 111a with no opening, the positive electrode active material mixture layer 111 is provided on the entire surface of the positive electrode current collector 110. In a part of the region 111b with the plurality of openings, the positive electrode active material mixture layer 111 is provided so as to have island patterns. On the other hand, in FIG. 6B, the positive electrode active material mixture layer 111 is provided not only on both sides of the positive electrode current collector 110 but also on the surfaces perpendicular to these sides, namely, on the top and bottom surfaces. Such a structure allows an effective use of the top and bottom surfaces of the positive electrode current collector 110, thereby increasing the surface area of the positive electrode active material mixture layer 111. In each of the structures illustrated in FIGS. 6A and 6B, the openings are formed on the top and bottom surfaces, which makes it possible to reduce or suppress the stress concentration on the portion bent in winding, and the flaking or exfoliation of the active material mixture layer in charge and discharge.

The cross-sectional structures of the positive electrode sheet are described above with reference to FIGS. 5A to 5D and FIGS. 6A and 6B; similar structures can also be applied to the negative electrode sheet. These structures are extremely effective particularly in the case where a material such as silicon, whose volume is largely expanded or contracted by charge and discharge, is used for the negative electrode active material mixture layer.

This embodiment can be implemented in appropriate combination with the other embodiments.

Embodiment 2

In this embodiment, examples of the shape or structure of the electrode sheet, which are different from those shown in Embodiment 1, will be described with reference to FIGS. 7A to 7C.

Figure 7A:
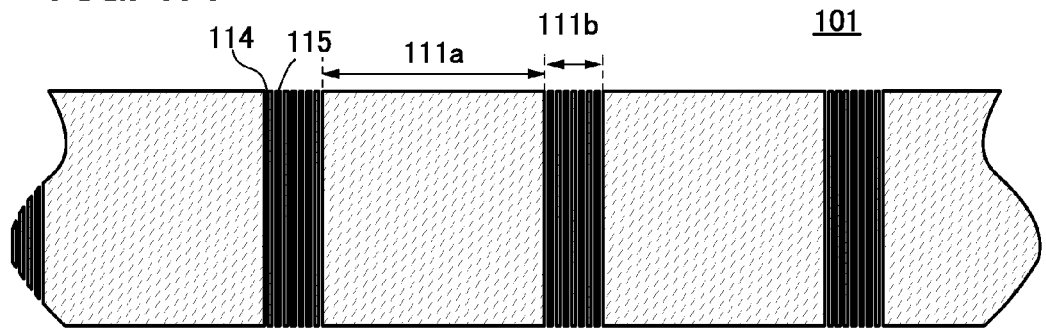
FIGS. 7A to 7C illustrate an electrode sheet.
Figure 7B:
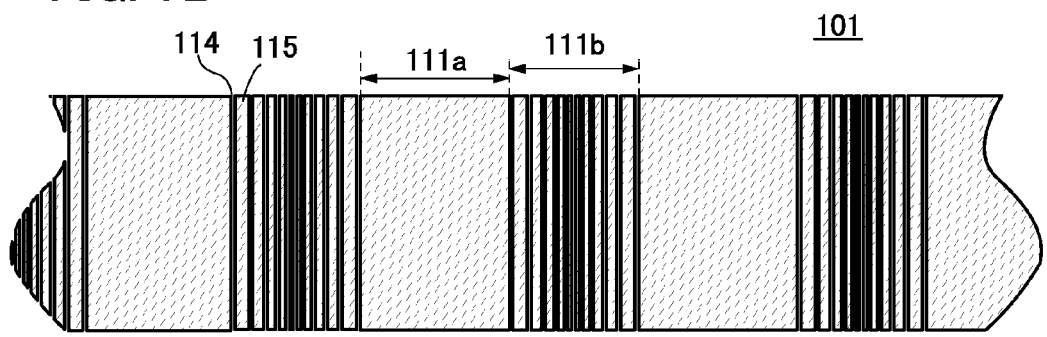

FIG. 7A is the same diagram as FIG. 3B, illustrating the shape or structure of the electrode sheet shown in Embodiment 1. In the region 111b with the plurality of openings, the plurality of openings 114 are arranged at regular intervals in the longitudinal direction of the electrode sheet. In FIG. 7B, in the region 111b with the plurality of openings, the plurality of openings 114 are not arranged at regular intervals, but the distance between the openings 114 is gradually decreased closer to the center of the region 111b while being gradually increased closer to the edge. When the openings in the region 111b with the plurality of openings are arranged in such a manner, the margin to compensate for the misalignment in the winding process can be further increased as compared to that in Embodiment 1 while a decrease in the area of the active material mixture layer can be suppressed, so that discharge capacity can be maintained.

Figure 7C:
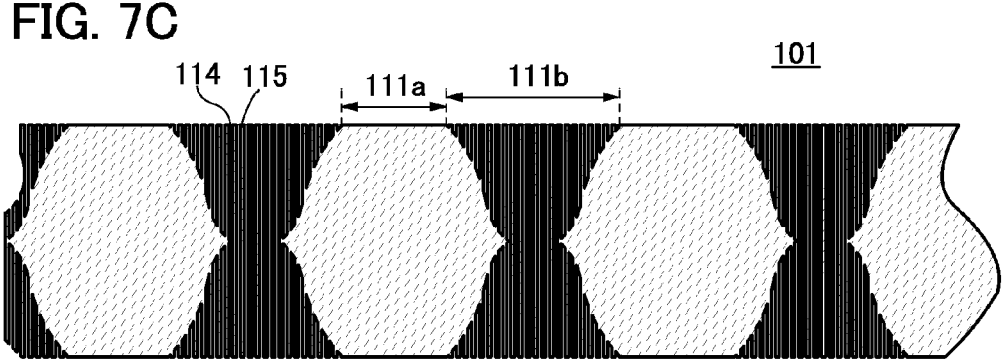

In FIG. 7C, some of the openings 114 whose ends are aligned with the ends of the electrode sheet have shorter lengths and are arranged at outer sides of the region 111b with the plurality of openings. With such a structure, the margin to compensate for the misalignment in the winding process can be further increased as compared to that in the shape or structure of the electrode sheet illustrated in FIG. 7A. In addition, the increased margin of the structure reduces stress even when stress in the direction other than the perpendicular direction is applied on the wound surface, which makes it possible to prevent the active material mixture layer from being flaked or exfoliated from the current collector.

This embodiment can be implemented in appropriate combination with the other embodiments.

Embodiment 3

In this embodiment, examples of the shape or structure of the electrode sheet, which are different from those shown in Embodiment 1 or 2, will be described with reference to FIG. 8.

Figure 8:
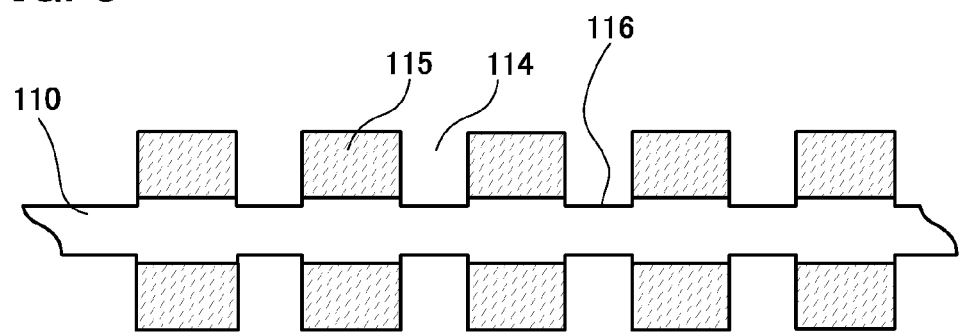
FIG. 8 illustrates an electrode sheet.

FIG. 8 illustrates a cross-sectional structure of the electrode sheet in the longitudinal direction in this embodiment. In the region 111b with the plurality of openings of the electrode sheet, a groove 116 of the current collector, which corresponds to the opening 114, is provided in an exposed area of the positive electrode current collector 110. The groove is not formed in another area of the positive electrode current collector 110 which is in contact with the positive electrode active material mixture layer 111. Accordingly, the surface of the positive electrode current collector 110 in the opening 114 is positioned at an inner side than the surface of the positive electrode current collector 110 in the island pattern 115 made of the positive electrode active material mixture layer 111. When the groove of the current collector is thus provided in the opening 114 of the active material mixture layer, the stress which occurs in the winding process and due to expansion and contraction of the active material mixture layer is concentrated on the bottom ends of the groove 116, which makes it possible to prevent the active material mixture layer 111 from being flaked or exfoliated from the current collector.

This embodiment can be implemented in appropriate combination with the other embodiments.

Embodiment 4

In this embodiment, the structure and manufacturing method of the square lithium secondary battery shown in Embodiment 1 or 2 will be described.

(Positive Electrode Sheet and Manufacturing Method Thereof)

Figure 9A:
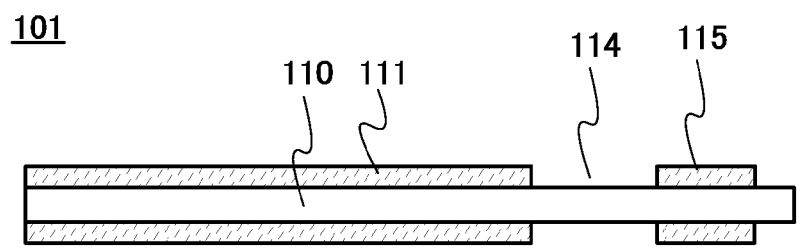
FIGS. 9A to 9C illustrate a positive electrode sheet.

First, a positive electrode sheet and a manufacturing method thereof will be described. FIG. 9A is a cross-sectional view of the positive electrode sheet 101. In the positive electrode sheet 101, the positive electrode active material mixture layer 111 is formed on the positive electrode current collector 110. The positive electrode active material mixture layer 111 includes the openings 114 and the island patterns 115.

The positive electrode current collector 110 can be made of a material having high conductivity such as a metal like stainless steel, gold, platinum, zinc, iron, copper, aluminum, or titanium, or an alloy thereof. The positive electrode current collector 110 can also be formed using an aluminum alloy to which an element which improves heat resistance, such as silicon, titanium, neodymium, scandium, or molybdenum, is added. Alternatively, the positive electrode current collector 110 may be formed using a metal element which forms silicide by reacting with silicon. Examples of the metal element which forms silicide by reacting with silicon are zirconium, titanium, hafnium, vanadium, niobium, tantalum, chromium, molybdenum, tungsten, cobalt, nickel, and the like. The positive electrode current collector 110 can have a foil shape, a plate shape (sheet shape), a net shape, a punching-metal shape, an expanded-metal shape, or the like as appropriate.

The positive electrode active material mixture layer 111 can include a compound such as $LiFeO_2$, $LiCoO_2$, $LiNiO_2$, $LiMn_2O_4$, $V_2O_5$, $Cr_2O_5$, or $MnO_2$.

Alternatively, a lithium-containing composite oxide having an olivine structure (a general formula $LiMPO_4$ (M is one or more of Fe(II), Mn(II), Co(II), and Ni(II))) may be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a lithium-containing composite oxide such as a general formula $Li_{(2-j)}MSiO_4$ (M is one or more of Fe(II), Mn(II), Co(II), and Ni(II), 0≤j≤2) can be used. Typical examples of the general formula $Li_{(2-j)}MSiO_4$, which can be used as a material, are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Instead of lithium in the lithium compound and the lithium-containing composite oxide, an alkali metal (e.g., sodium or potassium), an alkaline-earth metal (e.g., calcium, strontium, or barium), beryllium, or magnesium may be used as the positive electrode active material mixture layer 111 when carrier ions are alkali metal ions other than lithium ions, such as alkaline-earth metal ions, beryllium ions, or magnesium ions.

The positive electrode active material mixture layer 111 is not necessarily formed in direct contact with both surfaces of the positive electrode current collector 110. The following functional layers may be formed using a conductive material such as a metal between the positive electrode current collector 110 and the positive electrode active material mixture layer 111: an adhesion layer for increasing the adhesion between the positive electrode current collector 110 and the positive electrode active material mixture layer 111; a planarization layer for reducing the roughness of the surface of the positive electrode current collector 110; a heat radiation layer; a stress relaxation layer for reducing the stress on the positive electrode current collector 110 or the positive electrode active material mixture layer 111; or the like.

Figure 9B:
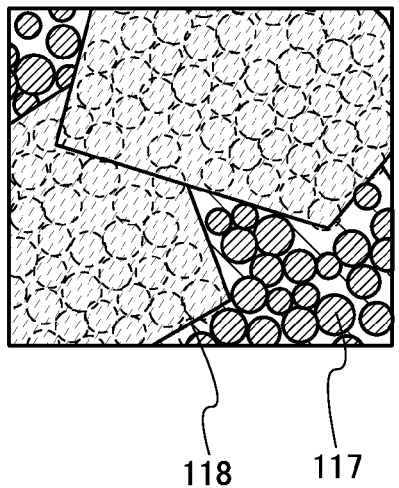

FIG. 9B is a plan view of the positive electrode active material mixture layer 111 including a positive electrode active material 117, which is particles capable of occluding and releasing carrier ions, and a graphene 118, which at least partly surrounds the plurality of particles of the positive electrode active material 117 while covering the particles. The graphene 118 covers surfaces of the plurality of particles of the positive electrode active material 117. The positive electrode active material 117 may partly be exposed.

Graphene is, in a narrow sense, a lateral layer of graphite, i.e., a carbon layer in which six-membered rings composed of carbon atoms are connected in the planar direction, and in other words, graphene refers to a sheet of carbon molecules having $sp^2$ bonds with a thickness of one atomic layer. In particular, a stack of 2 or more and 100 or less carbon layers, which is referred to as multilayer graphene in some cases, is also included in the category of graphene. Graphene contains oxygen at a concentration higher than or equal to 3 atomic % and lower than or equal to 10 atomic %.

Graphene is chemically stable and has favorable electrical characteristics. Graphene has high conductivity because six-membered rings each composed of carbon atoms are connected in the planar direction. That is, graphene has high conductivity in the planar direction. Graphene has a sheet-like shape and a gap is provided between stacked graphene layers in a direction parallel to the plane, so that ions can transfer in the gap. However, the transfer of ions in the direction perpendicular to the graphene layers is difficult.

The particle size of the positive electrode active material 117 is preferably greater than or equal to 20 nm and less than or equal to 100 nm. Note that the particle size of the positive electrode active material 117 is preferably as small as possible because electrons transfer in the positive electrode active material 117.

Use of both the graphene and the positive electrode active material covered with a graphite layer is preferred, in which case carriers transfer hopping between the positive electrode active materials to cause current flow, although sufficient characteristics can be obtained even when the surface of the positive electrode active material 117 is not covered with a graphite layer.

Figure 9C:
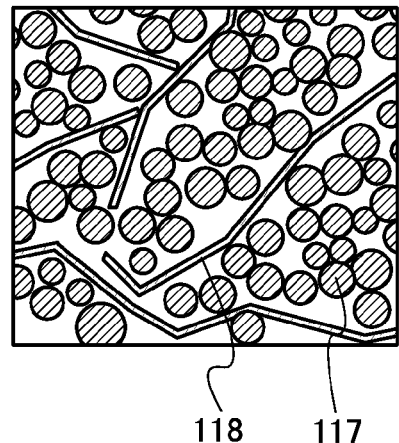

FIG. 9C is a cross-sectional view of a part of the positive electrode active material mixture layer 111 in FIG. 9B. The positive electrode active material mixture layer 111 includes the positive electrode active material 117 and the graphene 118 which partly covers the positive electrode active material 117. According to observation, the graphene 118 has a linear shape in cross-section. A plurality of particles of the positive electrode active material are surrounded with one graphene or plural graphenes. That is, the plurality of particles of the positive electrode active material exist within one graphene or among the plural graphenes. Note that the graphene has a bag-like shape and the plurality of particles of the positive electrode active material are surrounded with the bag-like portion in some cases. In other cases, the positive electrode active material is not covered with the graphene and partly exposed.

The desired thickness of the positive electrode active material mixture layer 111 is determined to be greater than or equal to 20 μm and less than or equal to 100 μm. It is preferable to adjust the thickness of the positive electrode active material mixture layer 111 as appropriate so that a crack and flaking are not caused.

Note that the positive electrode active material mixture layer 111 may contain acetylene black particles having a volume 0.1 times to 10 times as large as that of the graphene, carbon particles having a one-dimensional expansion (e.g., carbon nanofibers), or other known binders.

As an example of the positive electrode active material 117, there is a material whose volume is expanded by occlusion of ions serving as carriers. Thus, the positive electrode active material layer including such a material gets friable and is partly broken by charge and discharge, which reduces the reliability of the lithium secondary battery. However, even when the volume of the positive electrode active material is expanded by charge and discharge, since the graphene covers the periphery of the positive electrode active material, dispersion of the positive electrode active material and the breakdown of the positive electrode active material layer can be prevented. That is, the graphene has a function of maintaining the bond between the positive electrode active materials even when the volume of the positive electrode active materials is increased or decreased by charge and discharge. Therefore, by combining the graphene with the electrode sheet described in Embodiments 1 to 3, a square lithium secondary battery with high reliability can be manufactured.

The graphene 118 is in contact with a plurality of particles of the positive electrode active material and also serves as a conductive additive. Further, the graphene 118 has a function of holding the positive electrode active material 117 capable of occluding and releasing carrier ions. Thus, a binder does not need to be mixed into the positive electrode active material layer and the proportion of the positive electrode active material in the positive electrode active material layer can be increased, so that the charge and discharge capacity of a square lithium secondary battery can be increased.

Next, a method for manufacturing the positive electrode active material layer 111 will be described.

A slurry containing particles of the positive electrode active material and graphene oxide is formed. Then, the slurry is applied on both surfaces of the positive electrode current collector 110. At this time, the slurry is selectively applied on the surfaces other than the opening 114 because the positive electrode active material mixture layer 111 is not provided in the opening 114 in the region 111b with the plurality of openings. Note that the positive electrode active material mixture layer 111 is not applied on, for example, an area to which a positive electrode lead is welded later. After that, heating is performed in a reducing atmosphere for reduction treatment so that the positive electrode active material is baked and oxygen is released from graphene oxide to form gaps in the graphene. Note that oxygen in graphene oxide is not entirely reduced and partly remains in the graphene.

Through the above process, the positive electrode active material mixture layer 111 having a given pattern can be formed on the positive electrode current collector 110. Consequently, the positive electrode active material mixture layer has higher conductivity. Graphene oxide contains oxygen and therefore is negatively charged in a polar solvent. As a result of being negatively charged, graphene oxide is dispersed. Accordingly, the positive electrode active material contained in the slurry is not easily aggregated, so that baking can be prevented from increasing the particle size of the positive electrode active material. Thus, electrons are easy to transfer in the positive electrode active material, which increases the conductivity of the positive electrode active material mixture layer.

After being formed on the positive electrode current collector 110, the positive electrode active material mixture layer 111 is rolled with a roller press machine, whereby the positive electrode sheet 101 is manufactured.

(Negative Electrode Sheet and Manufacturing Method Thereof)

Next, a negative electrode sheet and a manufacturing method thereof will be described reference to FIG. 10A.

Figure 10A:
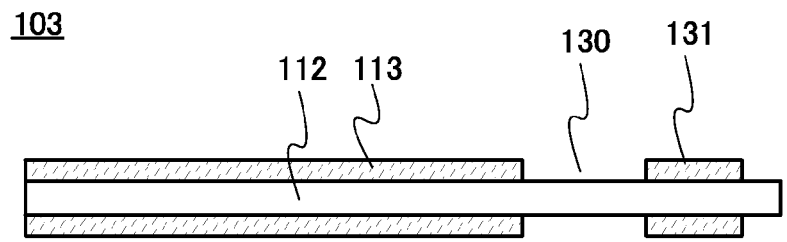
FIGS. 10A to 10D illustrate a negative electrode sheet.

As illustrated in FIG. 10A, the negative electrode sheet 103 includes a negative electrode current collector 112, and a negative electrode active material mixture layer 113 provided on both surfaces of the negative electrode current collector 112.

The negative electrode current collector 112 is made of a material having high conductivity such as a metal. As the material having high conductivity, for example, stainless steel, iron, aluminum, copper, nickel, or titanium can be used. The negative electrode current collector 112 can have a foil shape, a plate shape (sheet shape), a net shape, a punching-metal shape, an expanded-metal shape, or the like as appropriate.

The negative electrode active material mixture layer 113 is provided on both surfaces of the negative electrode current collector 112. The negative electrode active material mixture layer 113 is formed using a negative electrode active material capable of occluding and releasing carrier ions. Examples of the negative electrode active material are lithium, aluminum, graphite, silicon, tin, and germanium. A compound containing one or more of lithium, aluminum, graphite, silicon, tin, and germanium may also be used. Silicon may be doped with an element imparting conductivity such as phosphorus. When the theoretical capacity of the negative electrode active material is compared, germanium, silicon, lithium, and aluminum have a higher theoretical capacity than graphite. With high occlusion capacity, charge and discharge can be performed sufficiently even in a small area so that reduction in cost and size of a square lithium secondary battery can be achieved.

In this embodiment, the negative electrode active material mixture layer 113 may be manufactured in such a manner that a conductive additive and a binder are added to the negative electrode active material, and the material is ground, mixed, and baked.

As another example of the method for manufacturing the negative electrode sheet 103, like in the positive electrode sheet 101, graphene may be introduced into the negative electrode active material mixture layer 113 in the negative electrode sheet 103. As a result of this, the bond between the negative electrode active materials can be maintained even when the negative electrode active materials are expanded or contracted by charge and discharge. Further, the graphene also serves as a conductive additive.

In the case where graphite is used as the negative electrode active material, NMP (N-methylpyrrolidone) in which vinylidene fluoride-based polymer such as a polyvinylidene fluoride is dissolved is mixed as a binder with graphite powder, whereby a slurry is formed. Then, the slurry is applied on one or both of the surfaces of the negative electrode current collector 112, and dried. As in the manufacturing process of the positive electrode sheet, the slurry is selectively applied on the surfaces other than the opening in this coating step because the negative electrode active material mixture layer is not provided in the opening in the region with the plurality of openings. In the case where only one surface of the negative electrode current collector 112 is subjected to this coating step, the same step is repeated so that the negative electrode active material mixture layer is formed on the other surface. After that, the negative electrode active material mixture layer is rolled with a roller press machine, whereby the negative electrode sheet 103 is manufactured.

In the case where silicon is used as the negative electrode active material, since the volume of silicon increases about four times due to occlusion of carrier ions, the negative electrode active material mixture layer is easily flaked when thin-film silicon is simply formed on the negative electrode current collector 112. Therefore, silicon needs to be processed into a shape other than a thin-film shape, such as a particle shape, a whisker-like shape, or a nanowire shape.

An example of using a negative electrode active material with a particle shape or a whisker-like shape will be described below with reference to FIGS. 10A to 10D.

FIG. 10A is a cross-sectional view of the negative electrode sheet 103. In the negative electrode sheet 103, the negative electrode active material mixture layer 113 is formed on both surfaces of the negative electrode current collector 112. The negative electrode active material mixture layer 113 includes at least a negative electrode active material and may also include a binder, a conductive additive, or graphene. The negative electrode active material mixture layer 113 includes an opening 130 and an island pattern 131.

Figures 10B, 10C:
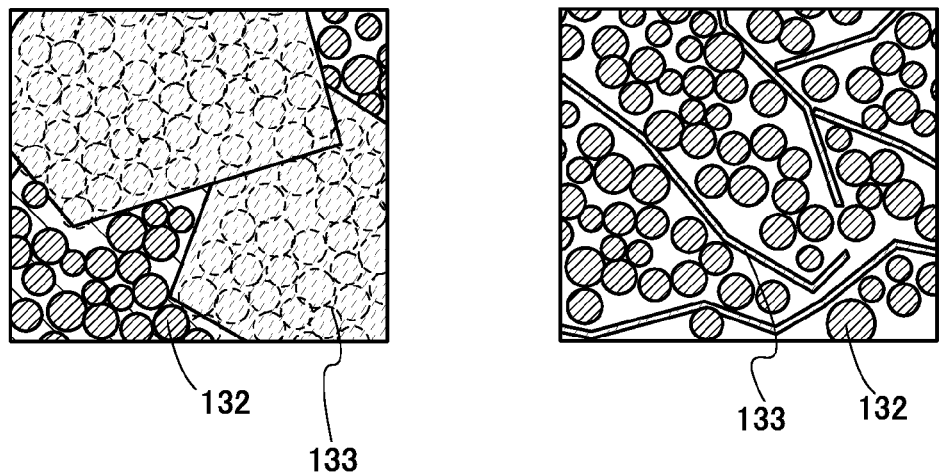

FIG. 10B is a plan view of a part of the negative electrode active material mixture layer 113. The negative electrode active material mixture layer 113 includes a negative electrode active material 132 which is particles, and a graphene 133 which at least partly surrounds a plurality of particles of the negative electrode active material 132 while covering the particles. In the negative electrode active material mixture layer 113 in the plan view, the different graphenes 133 cover surfaces of the plurality of particles of the negative electrode active material mixture layer 113. The negative electrode active material 132 may partly be exposed.

FIG. 10C is a cross-sectional view of a part of the negative electrode active material mixture layer 113 in FIG. 10B. FIG. 10C illustrates the negative electrode active material 132 and the graphene 133. The graphene 133 covers a plurality of the negative electrode active materials 132 in the negative electrode active material mixture layer 113 in the plan view. According to observation, the graphene 133 has a linear shape in cross-section. One graphene or plural graphenes overlap the plurality of particles of the negative electrode active material 132, or the plurality of particles of the negative electrode active material 132 exist within one graphene or among the plural graphenes. Note that the graphene 133 has a bag-like shape and the plurality of particles of the negative electrode active material are surrounded with the bag-like portion in some cases. In other cases, the graphene 133 partly has openings where the particles of the negative electrode active material 132 are exposed.

The desired thickness of the negative electrode active material mixture layer 113 is determined to be greater than or equal to 20 μm and less than or equal to 100 μm.

Note that the negative electrode active material mixture layer 113 may contain a known conductive additive such as acetylene black particles having a volume 0.1 times to 10 times as large as that of the graphene, or carbon particles having a one-dimensional expansion (e.g., carbon nanofibers), and/or a known binder such as polyvinylidene difluoride.

The negative electrode active material mixture layer 113 may be predoped with lithium in such a manner that a lithium layer is formed on a surface of the negative electrode active material mixture layer 113 by a sputtering method. Alternatively, lithium foil is provided on the surface of the negative electrode active material mixture layer 113, whereby the negative electrode active material mixture layer 113 can be predoped with lithium. The negative electrode active material mixture layer 113 is preferably predoped with lithium particular in the case where the graphene 118 is formed in the positive electrode active material mixture layer 111 of the positive electrode sheet 101 after the lithium secondary battery is assembled.

As an example of the negative electrode active material 132, there is a material whose volume is expanded by occlusion of carrier ions. Thus, the negative electrode active material layer including such a material gets friable and is partly broken by charge and discharge, which reduces the reliability (e.g., cycle characteristics) of the lithium secondary battery. However, even when the volume of the negative electrode active material 132 is expanded by charge and discharge, since the graphene 133 covers the periphery of the negative electrode active material 132, pulverization of the negative electrode active material 132 and breakdown of the negative electrode active material mixture layer 113 can be prevented. That is, the graphene 133 included in the negative electrode in the lithium secondary battery of one embodiment of the present invention has a function of maintaining the bond between the negative electrode active materials 132 even when the volume of the negative electrode active material 132 is increased or decreased by charge and discharge. Therefore, the use of the negative electrode sheet 103 increases the durability of a lithium secondary battery.

That is to say, a binder does not need to be used in forming the negative electrode active material mixture layer 113. Accordingly, the proportion of the negative electrode active material in the negative electrode active material layer with a certain weight (a certain volume) can be increased, leading to an increase in the charge and discharge capacity per unit weight (unit volume) of the electrode.

Since the graphene 133 has conductivity and is in contact with a plurality of particles of the negative electrode active material 132, it also serves as a conductive additive. That is, a conductive additive does not need to be used in forming the negative electrode active material mixture layer 113. Accordingly, the proportion of the negative electrode active material in the negative electrode active material layer with a certain weight (a certain volume) can be increased, leading to an increase in the charge and discharge capacity per unit weight (unit volume) of the electrode.

A sufficient conductive path (conductive path of carrier ions) is formed efficiently in the negative electrode active material mixture layer 113 containing the graphene 133, so that the negative electrode active material mixture layer 113 and the negative electrode sheet 103 have high conductivity. Accordingly, the capacity of the negative electrode active material 132 in a square lithium secondary battery including the negative electrode sheet 103, which is almost equivalent to the theoretical capacity, can be utilized efficiently and the charge capacity can thus be sufficiently increased.

Note that the graphene 133 also functions as a negative electrode active material capable of occluding and releasing carrier ions, leading to an increase in the charge capacity of the negative electrode sheet 103.

Next, a method for manufacturing the negative electrode active material mixture layer 113 illustrated in FIGS. 10B and 10C will be described.

A slurry containing particles of the negative electrode active material 132 and graphene oxide is formed. Specifically, the particles of the negative electrode active material 132 and a dispersion liquid containing graphene oxide are kneaded to form the slurry.

Then, the slurry is applied on the negative electrode current collector 112. Like in the case of forming graphite, the slurry is not applied in the opening in the region with the plurality of openings. Next, drying is performed in a vacuum for a certain period of time to remove a solvent from the slurry applied on the negative electrode current collector 112. After that, rolling with a roller press machine is performed.

Then, the graphene oxide is electrochemically reduced with electric energy to form the graphene 133. Through the above process, the negative electrode active material mixture layer 113 can be formed on both surfaces of the negative electrode current collector 112, whereby the negative electrode sheet 103 can be formed.

Next, the structure of a negative electrode illustrated in FIG. 10D will be described.

Figure 10D:
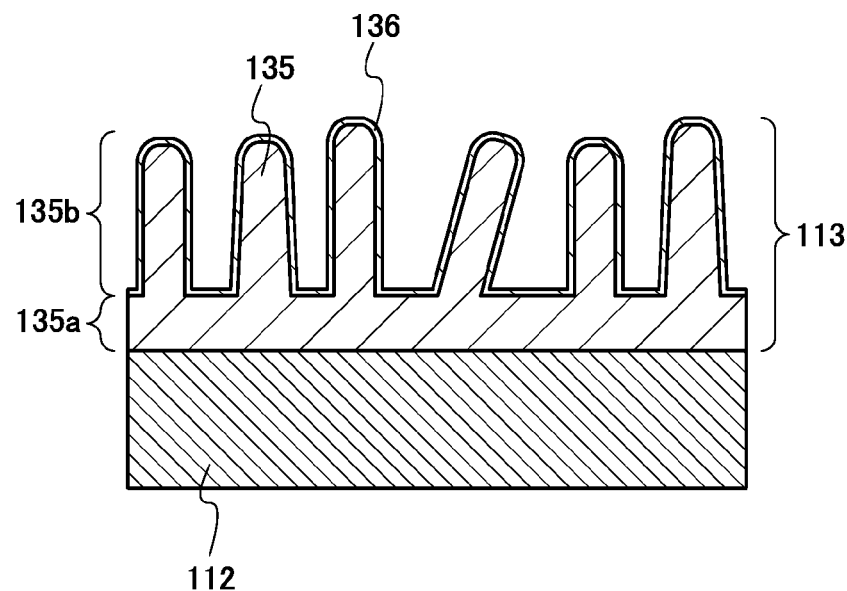

FIG. 10D is a cross-sectional view of the negative electrode sheet where a negative electrode active material mixture layer 134 is formed on the negative electrode current collector 112. The negative electrode active material mixture layer 134 includes a negative electrode active material 135 having an uneven surface and graphene 136 covering a surface of the negative electrode active material 135.

The uneven negative electrode active material 135 includes a common portion 135a and a projection portion 135b projecting from the common portion 135a. The projection portion 135b can have a columnar shape such as a cylinder shape or a prism shape, or a needle shape such as a cone shape or a pyramid shape as appropriate. The top of the projection portion may be curved. The negative electrode active material 135 is formed using a negative electrode active material capable of occluding and releasing carrier ions (typically, lithium ions). Note that the common portion 135a and the projection portion 135b may be formed using either the same material or different materials.

In the case where silicon is used as the negative electrode active material 135 in the negative electrode illustrated in FIG. 10D, even when the volume of the negative electrode active material 135 is expanded by charge and discharge, pulverization of the negative electrode active material 135 and breakdown of the negative electrode active material mixture layer 134 can be prevented because the graphene 136 covers the periphery of the negative electrode active material 135.

When a surface of a negative electrode active material layer is in contact with an electrolyte solution contained in a lithium secondary battery, the electrolyte solution and the negative electrode active material react with each other, so that a film is formed on a surface of a negative electrode. The film is called a solid electrolyte interface (SEI) and considered necessary to relieve the reaction of the negative electrode and the electrolyte solution for stabilization. However, with an increase in the thickness of the film, carrier ions are less likely to be occluded in the negative electrode, causing problems such as a decrease in carrier ion conductivity between the electrode and the electrolyte solution and a waste of the electrolyte solution.

The graphene 136 coating the surface of the negative electrode active material mixture layer 134 can prevent an increase in the thickness of the film, so that a decrease in charge and discharge capacity can be prevented.

As another structure of the uneven negative electrode active material 135, the following can be employed. A projection portion is formed on the negative electrode current collector 112 as a part of the negative electrode current collector 112, and the negative electrode active material with a thin film shape is provided to cover the projection portion.

Next, a method for manufacturing the negative electrode active material mixture layer 134 illustrated in FIG. 10D will be described.

The uneven negative electrode active material 135 is provided on both surfaces of the negative electrode current collector 112 by a printing method, an ink-jet method, a CVD method, or the like. Alternatively, a negative electrode active material having a film shape is formed by a coating method, a sputtering method, an evaporation method, or the like, and then is selectively removed, so that the uneven negative electrode active material 135 is provided on both surfaces of the negative electrode current collector 112. The negative electrode active material 135 is formed by the aforementioned methods so as not to be formed in the opening 130 in the region with the plurality of openings. Alternatively, the opening may be formed in such a manner that after the negative electrode active material 135 is formed on the entire surface, a part of the negative electrode active material 135 which is to be the opening 130 is removed by etching or the like.

Then, a dispersion liquid containing graphene oxide is applied on the uneven negative electrode active material 135. As a method for applying the dispersion liquid containing graphene oxide, the method described in Embodiment 1 may be employed as appropriate. Graphene oxide may be applied on the opening 130, in which case the negative electrode active materials 135 separated as island patterns 131 are bonded to each other, resulting in an increase in the strength of the uneven negative electrode active material 135.

After a solvent in the dispersion liquid containing graphene oxide is removed, the graphene oxide is electrochemically reduced with electric energy to form the graphene 136.

When the graphene is thus formed with the use of the dispersion liquid containing graphene oxide, the surface of the uneven negative electrode active material 135 can be covered with the graphene 136 with an even thickness.

Note that the uneven negative electrode active material 135 (hereinafter referred to as silicon whiskers) formed of silicon can be provided on the negative electrode current collector 112 by an LPCVD method using silane, silane chloride, silane fluoride, or the like as a source gas.

The silicon whiskers may be amorphous. When amorphous silicon whiskers are used for the negative electrode active material mixture layer 134, the volume is less likely to be changed due to occlusion and release of carrier ions (e.g., stress caused by expansion in volume is relieved). For this reason, pulverization of the silicon whiskers and breakdown of the negative electrode active material mixture layer 134 can be prevented from occurring due to repeated cycles of charge and discharge; accordingly, a lithium secondary battery can have further improved cycle characteristics.

Alternatively, the silicon whiskers may be crystalline. In this case, the current collector is widely in contact with the crystalline structure which has excellent conductivity and carrier ion mobility. Therefore, it is possible to further improve the conductivity of the entire negative electrode, which allows charge and discharge at much higher speed and further improvement in the charge and discharge capacity of a square lithium secondary battery.

Still alternatively, the silicon whiskers may include a core, which is a crystalline region, and an outer shell covering the core, which is an amorphous region.

The amorphous outer shell has characteristics that the volume is less likely to change due to occlusion and release of carrier ions (e.g., stress caused by expansion in volume is relieved). In addition, the crystalline core, which has excellent conductivity and carrier ion mobility, has characteristics that the rate of occluding carrier ions and the rate of releasing carrier ions are high per unit mass. Thus, when the silicon whiskers having the core and the outer shell are used for the negative electrode active material mixture layer 113, charge and discharge can be performed at high speed; accordingly, a square lithium secondary battery whose charge and discharge capacity and cycle characteristics are improved can be fabricated.

(Wound Body and Manufacturing Method Thereof)

The thus formed positive electrode sheet 101 and negative electrode sheet 103 overlap each other with the separator 102 interposed therebetween, whereby a collective sheet is obtained. After that, the collective sheet is wound while the separator 105 different from the separator 102 is put inside the collective sheet; thus, the wound body 100 is manufactured.

Note that the separator 102 and the separator 105 may be a continuous sheet. The separators 102 and 105 are made of an insulating porous material. Typical examples of the material of the separators 102 and 105 include paper; nonwoven fabric; a glass fiber; ceramics; and synthetic fiber containing nylon (polyamide), vinylon (polyvinyl alcohol-based fiber), polyester, acrylic, polyolefin, or polyurethane. Note that it is necessary to select a material which does not dissolve in an electrolyte solution.

In this winding process, the collective sheet is wound so that its bends are aligned with regions with a plurality of openings which are provided in each of the positive electrode sheet 101 and the negative electrode sheet 103. In the winding process, the collective sheet and the separator are rolled around a core plate, and the core plate is removed after the winding, so that a flat wound body is formed. Since the regions with a plurality of openings provided in each of the positive electrode sheet 101 and the negative electrode sheet 103 are manufactured including a margin, the bends are covered with the regions with a plurality of openings even when misalignment due to winding occurs in the range of design. Accordingly, the openings in the collective sheet allow a reduction in the stress applied on the bends, whereby a square lithium secondary battery with high reliability can be provided.

(Square Lithium Secondary Battery)

Figure 11:
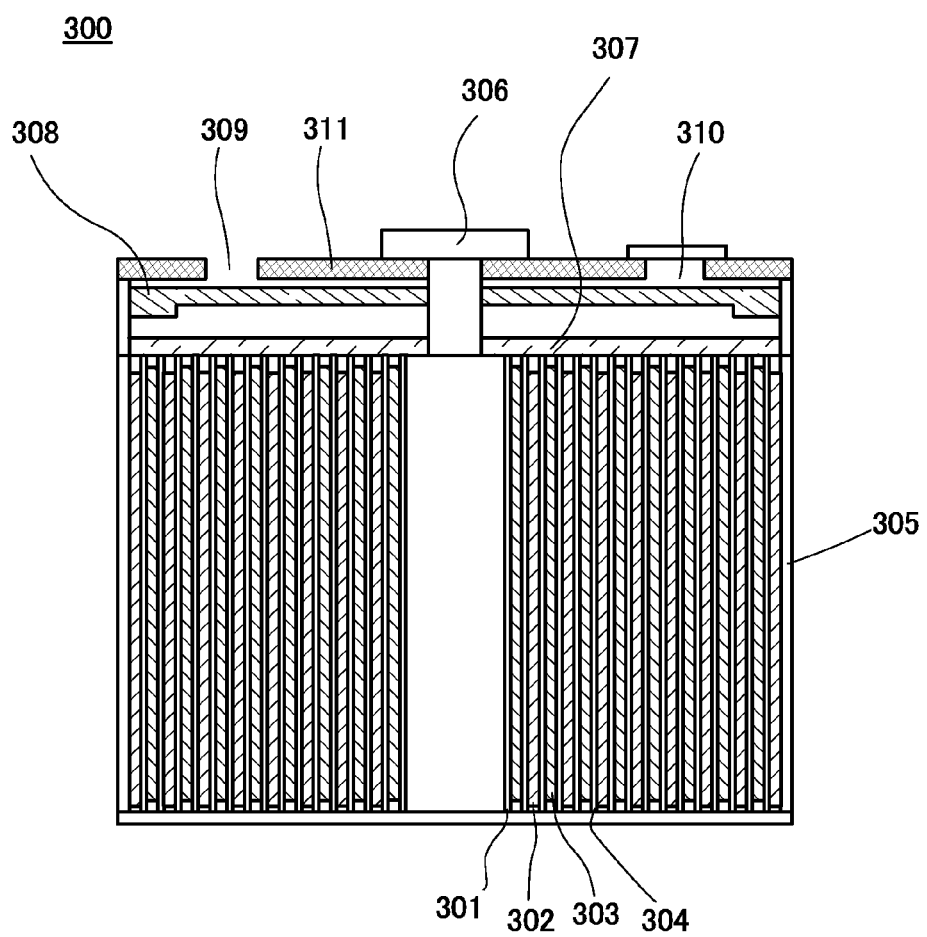
FIG. 11 illustrates a square lithium secondary battery.

Next, one embodiment of the structure of the square lithium secondary battery will be described with reference to FIG. 11.

In a square lithium secondary battery 300, a positive electrode terminal 305 serving as a packaging can and a negative electrode terminal 306 are sealed for insulation with a gasket 311 made of polypropylene or the like. The aforementioned wound body is put in the packaging can, and an electrolyte solution is injected. The wound body is formed in the aforementioned manner: a positive electrode sheet 302 and a negative electrode sheet 303 overlap each other with a separator 304 interposed therebetween, so that a collective sheet is obtained, and the collective sheet is wound while a separator 301 is put inside the collective sheet. For the wound body, the electrode sheet described in the other embodiments can be employed. Although not illustrated, a positive electrode lead welded to one end of the positive electrode sheet 302 is electrically connected to the positive electrode terminal 305, and a negative electrode lead welded to one end of the negative electrode sheet 303 is electrically connected to the negative electrode terminal 306. The inside of the packaging can is filled with the electrolyte solution injected through an injection inlet 310, and sealed with an insulating plate 307 or a spacer 308. Note that the negative electrode terminal may serve as a packaging can, in which case the positive electrode and the negative electrode are replaced with each other.

As a solute of the electrolyte solution, a material which contains carrier ions is used. Typical examples of the solute of the electrolyte solution include lithium salts such as $LiClO_4$, $LiAsF_6$, $LiBF_4$, $LiPF_6$, and $Li(C_2F_5SO_2)_2N$.

Instead of lithium in the above lithium salts, an alkali metal (e.g., sodium or potassium), an alkaline-earth metal (e.g., calcium, strontium, or barium), beryllium, or magnesium may be used as the solute of the electrolyte solution when carrier ions are alkali metal ions other than lithium ions, such as alkaline-earth metal ions, beryllium ions, or magnesium ions.

As a solvent of the electrolyte solution, a material in which carrier ions can transfer is used. As the solvent of the electrolyte solution, an aprotic organic solvent is preferably used. Typical examples of the aprotic organic solvent include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolyte solution, safety against liquid leakage and the like is improved. Further, a reduction in the thickness and weight of the square lithium secondary battery can be achieved. Typical examples of the gelled high-molecular material include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which are less likely to burn and volatilize as a solvent of the electrolyte solution can prevent a lithium secondary battery from exploding or catching fire even when the lithium secondary battery internally shorts out or the internal temperature increases due to overcharging or the like.

Instead of the electrolyte solution, it is possible to use a solid electrolyte containing an inorganic material such as a sulfide-based or oxide-based inorganic material, or a solid electrolyte containing a high-molecular material such as a polyethylene oxide (PEO)-based high-molecular material. When the solid electrolyte solution is used, it is not necessary to provide a separator. Furthermore, since the whole battery can be solidified, liquid leakage is not caused resulting in a significant improvement in the safety.

The packaging can (positive electrode) 305 and the negative electrode terminal 306 can be made of a corrosion-resistant metal such as nickel, aluminum, or titanium, an alloy of any of these metals, or an alloy of any of these metals and other metals (e.g., stainless steel). In particular, a corrosion metal is preferably plated with nickel or the like in order to prevent corrosion by the electrolyte solution, which is caused by charge and discharge of the secondary battery.

The gasket 311 includes a gas exhaust valve 309 through which gas is released from the battery when the pressure inside the battery increases above a predetermined threshold value. Although not illustrated, a positive temperature coefficient (PTC) element, which is a heat sensitive resistor whose resistance increases with an increase in temperature, is preferably provided so as to prevent abnormal heating by limiting the amount of current by an increase in resistance. For the PTC element, barium titanate ($BaTiO_3$)-based semiconductor ceramics or the like can be used.

This embodiment can be implemented in appropriate combination with the other embodiments.

Embodiment 5

A square lithium secondary battery of one embodiment of the present invention can be used for power supplies of a variety of electric devices.

Specific examples of electric devices each utilizing the square lithium secondary battery of one embodiment of the present invention are as follows: display devices such as televisions and monitors, lighting devices, desktop or laptop personal computers, word processors, image reproduction devices which reproduce still images or moving images stored in recording media such as digital versatile discs (DVDs), portable compact disc (CD) players, radio receivers, tape recorders, stereos, clocks such as table clocks and wall clocks, cordless phone handsets, transceivers, portable wireless devices, cellular phones, car phones, portable game machines, calculators, portable information terminals, electronic notebooks, e-book readers, electronic translators, audio input devices, cameras such as still cameras and video cameras, electric shavers, a high-frequency heating appliance such as a microwave oven, electric rice cookers, electric washing machines, electric vacuum cleaners, water heaters, electric fans, hair dryers, air-conditioning systems such as humidifiers, dehumidifiers, and air conditioners, dishwashing machines, dish drying machines, clothes dryers, futon dryers, electric refrigerators, electric freezers, electric refrigerator-freezers, freezers for preserving DNA, flashlights, electric power tools such as chain saws, smoke detectors, and medical equipment such as dialyzers. The examples also include industrial equipment such as guide lights, traffic lights, belt conveyors, elevators, escalators, industrial robots, power storage systems, and power storage devices for leveling the amount of power supply and smart grid. In addition, moving objects driven by electric motors using power from lithium secondary batteries are also included in the category of electric devices. As examples of the moving objects, there are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats or ships, submarines, helicopters, aircrafts, rockets, artificial satellites, space probes, planetary probes, and spacecrafts.

In the above electric devices, the square lithium secondary battery of one embodiment of the present invention can be used as a main power supply for supplying enough power for almost the whole power consumption. Alternatively, in the above electric devices, the square lithium secondary battery of one embodiment of the present invention can be used as an uninterruptible power supply which can supply power to the electric devices when the supply of power from the main power supply or a commercial power supply is stopped. Still alternatively, in the above electric devices, the square lithium secondary battery of one embodiment of the present invention can be used as an auxiliary power supply for supplying power to the electric devices at the same time as the power supply from the main power supply or a commercial power supply.

Figure 12:
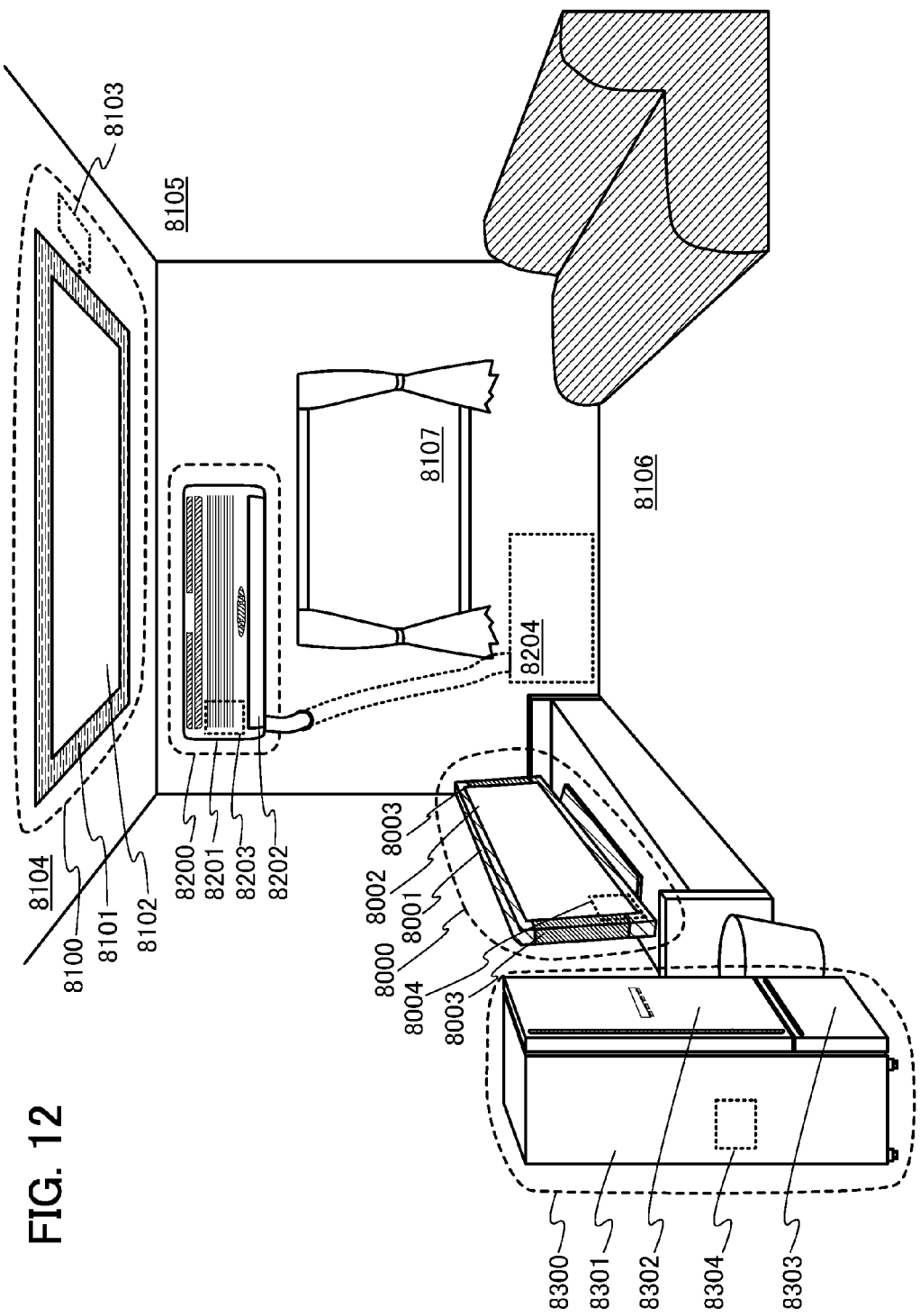
FIG. 12 illustrates electric devices.

FIG. 12 illustrates specific structures of the above electric devices. In FIG. 12, a display device 8000 is an example of an electric device including a square lithium secondary battery 8004 of one embodiment of the present invention. Specifically, the display device 8000 corresponds to a display device for TV broadcast reception and includes a housing 8001, a display portion 8002, speaker portions 8003, the square lithium secondary battery 8004, and the like. The square lithium secondary battery 8004 of one embodiment of the present invention is provided inside the housing 8001. The display device 8000 can receive power from a commercial power supply, or can use power stored in the square lithium secondary battery 8004. Thus, the display device 8000 can be operated with the use of the square lithium secondary battery 8004 of one embodiment of the present invention as an uninterruptible power supply even when power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 12, an installation lighting device 8100 is an example of an electric device including a square lithium secondary battery 8103 of one embodiment of the present invention. Specifically, the lighting device 8100 includes a housing 8101, a light source 8102, the square lithium secondary battery 8103, and the like. Although FIG. 12 illustrates the case where the square lithium secondary battery 8103 is provided inside a ceiling 8104 on which the housing 8101 and the light source 8102 are installed, the square secondary battery 8103 may be provided inside the housing 8101. The lighting device 8100 can receive power from a commercial power supply, or can use power stored in the square lithium secondary battery 8103. Thus, the lighting device 8100 can be operated with the use of the square lithium secondary battery 8103 of one embodiment of the present invention as an uninterruptible power supply even when power cannot be supplied from a commercial power supply due to power failure or the like.

Although the installation lighting device 8100 provided in the ceiling 8104 is illustrated in FIG. 12 as an example, the square lithium secondary battery of one embodiment of the present invention can be used for an installation lighting device provided in, for example, a wall 8105, a floor 8106, a window 8107, or the like other than the ceiling 8104. Further, the square lithium secondary battery can be used in a tabletop lighting device or the like.

As the light source 8102, an artificial light source which emits light artificially by using power can be used. Specifically, an incandescent lamp, a discharge lamp such as a fluorescent lamp, and light-emitting elements such as an LED or an organic EL element are given as examples of the artificial light source.

In FIG. 12, an air conditioner including an indoor unit 8200 and an outdoor unit 8204 is an example of an electric device including a square lithium secondary battery 8203 of one embodiment of the present invention. Specifically, the indoor unit 8200 includes a housing 8201, an air outlet 8202, the square lithium secondary battery 8203, and the like. Although FIG. 12 illustrates the case where the square lithium secondary battery 8203 is provided in the indoor unit 8200, the square lithium secondary battery 8203 may be provided in the outdoor unit 8204. Alternatively, the square lithium secondary battery 8203 may be provided in both the indoor unit 8200 and the outdoor unit 8204. The air conditioner can receive power from a commercial power supply, or can use power stored in the square lithium secondary battery 8203. Particularly in the case where the square lithium secondary battery 8203 is provided in both the indoor unit 8200 and the outdoor unit 8204, the air conditioner can be operated with the use of the square lithium secondary battery 8203 of one embodiment of the present invention as an uninterruptible power supply even when power cannot be supplied from a commercial power supply due to power failure or the like.

Although the split-type air conditioner including the indoor unit and the outdoor unit is illustrated in FIG. 12 as an example, the square lithium secondary battery of one embodiment of the present invention can be used in an air conditioner in which the functions of an indoor unit and an outdoor unit are integrated in one housing.

In FIG. 12, an electric refrigerator-freezer 8300 is an example of an electric device including a square lithium secondary battery 8304 of one embodiment of the present invention. Specifically, the electric refrigerator-freezer 8300 includes a housing 8301, a door for a refrigerator 8302, a door for a freezer 8303, the square lithium secondary battery 8304, and the like. The square lithium secondary battery 8304 is provided inside the housing 8301 in FIG. 12. The electric refrigerator-freezer 8300 can receive power from a commercial power supply, or can use power stored in the square lithium secondary battery 8304. Thus, the electric refrigerator-freezer 8300 can be operated with the use of the square lithium secondary battery 8304 of one embodiment of the present invention as an uninterruptible power supply even when power cannot be supplied from a commercial power supply due to power failure or the like.

Note that among the electric devices described above, a high-frequency heating device such as a microwave oven and an electric device such as an electric rice cooker requires high power in a short time. The tripping of a breaker of a commercial power supply in use of an electric device can be prevented by using the square lithium secondary battery of one embodiment of the present invention as an auxiliary power supply for supplying power which cannot be supplied enough by the commercial power supply.

In addition, in a time period when electric devices are not used, particularly when the proportion of the amount of power which is actually used to the total amount of power which can be supplied from a commercial power supply source (such a proportion referred to as a usage rate of power) is low, power can be stored in the square lithium secondary battery, whereby the usage rate of power can be reduced in a time period when the electric devices are used. For example, in the case of the electric refrigerator-freezer 8300, power can be stored in the square lithium secondary battery 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the square lithium secondary battery 8304 is used as an auxiliary power supply; thus, the usage rate of power in daytime can be reduced.

This embodiment can be implemented in appropriate combination with the other embodiments.

Embodiment 6

Next, a portable information terminal which is an example of the electric devices will be described with reference to FIGS. 13A to 13C.

FIGS. 13A and 13B illustrate a tablet terminal that can be folded. In FIG. 13A, the tablet terminal is opened, and includes a housing 9630, a display portion 9631a, a display portion 9631b, a display-mode switching button 9034, a power button 9035, a power-saving-mode switching button 9036, a clip 9033, and an operation button 9038.

A touch panel area 9632a can be provided in a part of the display portion 9631a, in which area, data can be input by touching displayed operation keys 9638. Half of the display portion 9631a has only a display function and the other half has a touch panel function; however, an embodiment of the present invention is not limited to this structure, and the whole display portion 9631a may have a touch panel function. For example, a keyboard can be displayed on the whole display portion 9631a to be used as a touch panel, and the display portion 9631b can be used as a display screen.

A touch panel area 9632b can be provided in a part of the display portion 9631b like in the display portion 9631a. When a keyboard display switching button 9639 displayed on the touch panel is touched with a finger, a stylus, or the like, a keyboard can be displayed on the display portion 9631b.

The touch panel area 9632a and the touch panel area 9632b can be controlled by touch input at the same time.

The display-mode switching button 9034 allows switching between a landscape mode and a portrait mode, color display and black-and-white display, and the like. The power-saving-mode switching button 9036 allows optimizing the display luminance in accordance with the amount of external light in use which is detected by an optical sensor incorporated in the tablet terminal. In addition to the optical sensor, other detecting devices such as sensors for detecting inclination, like a gyroscope or an acceleration sensor, may be incorporated in the tablet terminal.

Although the display portion 9631a and the display portion 9631b have the same display area in FIG. 13A, an embodiment of the present invention is not limited to this example. The display portion 9631a and the display portion 9631b may have different areas or different display quality. For example, higher definition images may be displayed on one of the display portions 9631a and 9631b.

FIG. 13B illustrates the tablet terminal folded, which includes the housing 9630, a solar battery 9633, a charge and discharge control circuit 9634, a battery 9635, and a DCDC converter 9636. Note that FIG. 13B shows an example in which the charge and discharge control circuit 9634 includes the battery 9635 and the DCDC converter 9636, and the battery 9635 includes the square lithium secondary battery described in any of the above embodiments.

Since the tablet terminal can be folded, the housing 9630 can be closed when not in use. Thus, the display portions 9631a and 9631b can be protected, which makes it possible to provide a tablet terminal with high durability and improved reliability for long-term use.

The tablet terminal illustrated in FIGS. 13A and 13B can have other functions such as a function of displaying various kinds of data (e.g., a still image, a moving image, and a text image), a function of displaying a calendar, a date, the time, or the like on the display portion, a touch-input function of operating or editing the data displayed on the display portion by touch input, and a function of controlling processing by various kinds of software (programs).

The solar battery 9633, which is attached on the surface of the tablet terminal, supplies electric power to a touch panel, a display portion, an image signal processor, and the like. Note that the solar battery 9633 can be provided on one or both surfaces of the housing 9630 so that the battery 9635 can be charged efficiently. The use of the lithium secondary battery of one embodiment of the present invention as the battery 9635 is advantageous in downsizing or the like.

The structure and operation of the charge and discharge control circuit 9634 illustrated in FIG. 13B are described with reference to a block diagram of FIG. 13C. FIG. 13C illustrates the solar battery 9633, the battery 9635, the DCDC converter 9636, a converter 9637, switches SW1 to SW3, and the display portion 9631. The battery 9635, the DCDC converter 9636, the converter 9637, and the switches SW1 to SW3 correspond to the charge and discharge control circuit 9634 in FIG. 13B.

First, description is made on an example of the operation in the case where power is generated by the solar battery 9633 using external light. The voltage of power generated by the solar battery 9633 is raised or lowered by the DCDC converter 9636 so that a voltage for charging the battery 9635 is obtained. When the display portion 9631 is operated with the power from the solar battery 9633, the switch SW1 is turned on and the voltage of the power is raised or lowered by the converter 9637 to a voltage needed for operating the display portion 9631. When display is not performed on the display portion 9631, the switch SW1 is turned off and the switch SW2 is turned on so that the battery 9635 can be charged.

Although the solar battery 9633 is shown as an example of a power generation means, there is no particular limitation on the power generation means and the battery 9635 may be charged with another means such as a piezoelectric element or a thermoelectric conversion element (Peltier element). For example, the battery 9635 may be charged with a non-contact power transmission module which is capable of charging by transmitting and receiving power by wireless (without contact), or another charge means used in combination.

It is needless to say that an embodiment of the present invention is not limited to the electric device illustrated in FIGS. 13A to 13C as long as the square lithium secondary battery described in any of the above embodiments is included.

This embodiment can be implemented in appropriate combination with the other embodiments.

Embodiment 7

Further, an example of the moving objects which are examples of the electric devices will be described with reference to FIGS. 14A and 14B.

The square lithium secondary battery described in any of Embodiments 1 to 3 can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 14A:
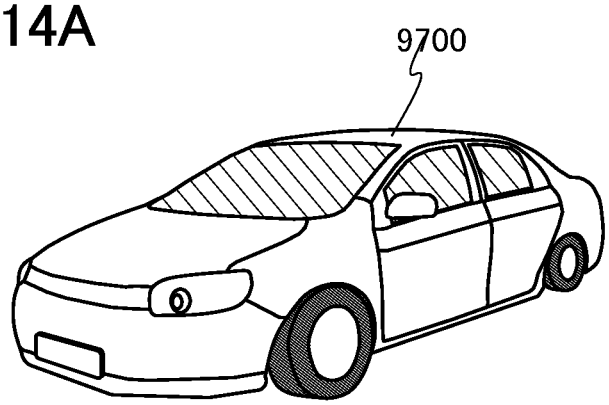
FIGS. 14A and 14B illustrate an electric device.
Figure 14B:
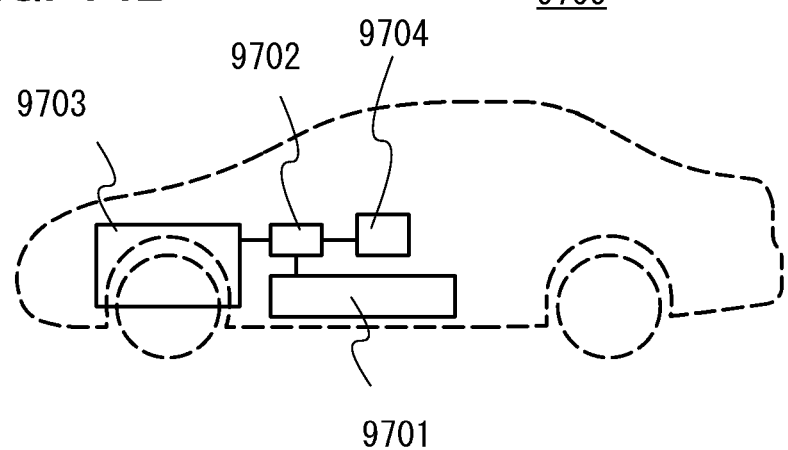

FIGS. 14A and 14B illustrate an example of an electric vehicle. An electric vehicle 9700 is equipped with a square lithium secondary battery 9701. The output of the electric power of the square lithium secondary battery 9701 is adjusted by a control circuit 9702 so that the electric power is supplied to a driving device 9703. The control circuit 9702 is controlled by a processing unit 9704 including a ROM, a RAM, a CPU, or the like which is not illustrated.

The driving device 9703 includes a DC motor or an AC motor either alone or in combination with an internal-combustion engine. The processing unit 9704 outputs a control signal to the control circuit 9702 based on input data such as data of operation (e.g., acceleration, deceleration, or stop) by a driver or data during driving (e.g., data on an upgrade or a downgrade, or data on a load on a driving wheel) of the electric vehicle 9700. The control circuit 9702 adjusts the electric energy supplied from the square lithium secondary battery 9701 in accordance with the control signal of the processing unit 9704 to control the output of the driving device 9703. In the case where the AC motor is mounted, although not illustrated, an inverter which converts direct current into alternate current is also incorporated.

Charge of the square lithium secondary battery 9701 can be performed by external electric power supply using a plug-in technique. For example, the square lithium secondary battery 9701 can be charged through a power plug from a commercial power supply. The square lithium secondary battery 9701 can be charged by converting external power into DC constant voltage having a predetermined voltage level through a converter such as an AC-DC converter. When the square lithium secondary battery of one embodiment of the present invention is provided as the square lithium secondary battery 9701, shortened charging time or the like can be achieved and convenience can be improved. Moreover, the higher charging and discharging rate of the square lithium secondary battery 9701 can contribute to greater acceleration and excellent performance of the electric vehicle 9700. When the square lithium secondary battery 9701 itself can be made compact and lightweight with improved characteristics of the square lithium secondary battery 9701, the vehicle can be made lightweight and fuel efficiency can be increased.

This embodiment can be implemented in appropriate combination with the other embodiments.

This application is based on Japanese Patent Application serial No. 2011-266641 filed with Japan Patent Office on Dec. 6, 2011, the entire contents of which are hereby incorporated by reference.

What is claimed is:

1. A battery comprising:
a positive electrode sheet;
a negative electrode sheet; and
a separator interposed between the positive electrode sheet and the negative electrode sheet,
wherein the positive electrode sheet, the negative electrode sheet, and the separator are wound, so that each of the positive electrode sheet, the negative electrode sheet, and the separator includes a bent portion,
wherein the bent portion of one of the positive electrode sheet and the negative electrode sheet includes a plurality of openings, and
wherein a distance between the plurality of openings is gradually decreased closer to a portion having the smallest radius of curvature in the bent portion.

2. The battery according to claim 1,
wherein the one of the positive electrode sheet and the negative electrode sheet includes a layer including an active material, and
wherein the plurality of openings is provided in the layer.

3. The battery according to claim 1, wherein the bent portion of the other one of the positive electrode sheet and the negative electrode sheet includes an opening.

4. The battery according to claim 1,
wherein the one of the positive electrode sheet and the negative electrode sheet includes a second bent portion including a second opening, and
wherein the bent portion including the plurality of openings and the second bent portion including the second opening overlap each other.

5. The battery according to claim 1 is a square battery.

6. The battery according to claim 1 is a square lithium secondary battery.

7. A square battery comprising a wound body, in the wound body, a collective sheet in which a positive electrode sheet and a negative electrode sheet overlap each other with a first separator interposed therebetween is wound while a second separator is put inside the collective sheet,
wherein in each of the positive electrode sheet and the negative electrode sheet, an active material mixture layer is provided on both surfaces of a current collector,
wherein the active material mixture layer on one or both surfaces of at least one of the positive electrode sheet and the negative electrode sheet includes a region with a plurality of openings and a region with no opening,
wherein at least a bent portion of the collective sheet is covered with the region with the plurality of openings, and
wherein a distance between the plurality of openings is gradually decreased closer to a portion having the smallest radius of curvature in the bent portion.

8. The square battery according to claim 7, wherein the plurality of openings are provided along the entire length of the collective sheet in a direction perpendicular to a longitudinal direction of the collective sheet.

9. The square battery according to claim 7, wherein the plurality of openings are arranged at equal intervals in the region with the plurality of openings.

10. The square battery according to claim 7, wherein the active material mixture layer in the negative electrode sheet includes silicon.

11. The square battery according to claim 7, wherein the active material mixture layer in each of the positive electrode sheet and the negative electrode sheet is provided on a top surface and a bottom surface of the current collector included in each of the positive electrode sheet and the negative electrode sheet.

12. The square battery according to claim 7, wherein the first separator and the second separator are a continuous sheet.

13. The square battery according to claim 7 is a square lithium secondary battery.

14. An electric device comprising the square battery according to claim 7.

15. A battery comprising:
a positive electrode sheet;
a negative electrode sheet; and
a separator interposed between the positive electrode sheet and the negative electrode sheet,
wherein the positive electrode sheet, the negative electrode sheet, and the separator are wound, so that each of the positive electrode sheet, the negative electrode sheet, and the separator includes a bent portion,
wherein the bent portion of one of the positive electrode sheet and the negative electrode sheet includes a plurality of openings, and
wherein the plurality of openings are arranged more closely closer to a portion having the smallest radius of curvature in the bent portion.

16. The battery according to claim 15,
wherein the one of the positive electrode sheet and the negative electrode sheet includes a layer including an active material, and
wherein the plurality of openings is provided in the layer.

17. The battery according to claim 15, wherein the bent portion of the other one of the positive electrode sheet and the negative electrode sheet includes an opening.

18. The battery according to claim 15,
wherein the one of the positive electrode sheet and the negative electrode sheet includes a second bent portion including a second opening, and
wherein the bent portion including the plurality of openings and the second bent portion including the second opening overlap each other.

19. The battery according to claim 15 is a square battery.

20. The battery according to claim 15 is a square lithium secondary battery.

* * * * *